United States Patent
Zeng et al.

(10) Patent No.: US 11,282,297 B2
(45) Date of Patent: Mar. 22, 2022

(54) SYSTEM AND METHOD FOR VISUAL ANALYSIS OF EMOTIONAL COHERENCE IN VIDEOS

(71) Applicant: Blue Planet Training, Inc., Montclair, NJ (US)

(72) Inventors: Haipeng Zeng, Kowloon (HK); Xingbo Wang, Kowloon (HK); Aoyu Wu, Kowloon (HK); Yong Wang, Kowloon (HK); Quan Li, Shenzhen (CN); Huamin Qu, Kowloon (HK)

(73) Assignee: Blue Planet Training, Inc., Montclair, NJ (US)

( * ) Notice: Subject to any disclaimer, the term of this patent is extended or adjusted under 35 U.S.C. 154(b) by 52 days.

(21) Appl. No.: 17/009,826

(22) Filed: Sep. 2, 2020

(65) Prior Publication Data
US 2021/0073526 A1    Mar. 11, 2021

Related U.S. Application Data

(60) Provisional application No. 62/898,199, filed on Sep. 10, 2019.

(51) Int. Cl.
*G06V 40/20* (2022.01)
*G06F 40/20* (2020.01)
(Continued)

(52) U.S. Cl.
CPC .............. *G06V 40/20* (2022.01); *G06F 40/20* (2020.01); *G06V 20/41* (2022.01); *G06V 40/161* (2022.01);
(Continued)

(58) Field of Classification Search
CPC .......... G06K 9/00315; G06K 9/00302; G06K 9/00335; G06K 9/00268; G06K 9/00221;
(Continued)

(56) References Cited

U.S. PATENT DOCUMENTS

2011/0283190 A1\* 11/2011 Poltorak ............. H04L 12/2818
715/716
2014/0112556 A1\* 4/2014 Kalinli-Akbacak ........................
G06K 9/00302
382/128

(Continued)

OTHER PUBLICATIONS

Connecting Deep Neural Networks to Physical, Perceptual, and Electrophysiological Auditory Signals (Year: 2018).\*

(Continued)

*Primary Examiner* — Nizar N Sivji

(57) ABSTRACT

A computer implemented method and system processing a video signal. The method comprises comprising the steps of: detecting a human face displayed in the video signal and extracting physiological, biological, or behavior state information from the displayed face at a first level of granularity of the video signal; processing any two or more of: (i) a script derived from or associated with the video signal to extract language tone information from said script at a first level of granularity of the script; (ii) an audio signal derived from or associated with the video signal to derive behavior state information from said audio signal at a first level of granularity of the audio signal; (iii) a video image derived from the video signal to detect one or more human gestures of the person whose face is displayed in the video signal; and merging said physiological, biological, or behavior state information extracted from the displayed face in the video signal with any two or more of: (i) the language tone information extracted from the script; (ii) the behavior state information derived from the audio signal; and (iii) and the one or more human gestures derived from the video image, wherein the merging step is based on behavior state categories and/or levels of granularity.

19 Claims, 12 Drawing Sheets

(51) Int. Cl.
*G10L 25/21* (2013.01)
*G10L 25/63* (2013.01)
*G06V 20/40* (2022.01)
*G06V 40/16* (2022.01)

(52) U.S. Cl.
CPC ............ *G06V 40/176* (2022.01); *G10L 25/21* (2013.01); *G10L 25/63* (2013.01)

(58) Field of Classification Search
CPC ............ G06K 9/00228; G06K 9/00718; G06F 3/017; G06F 40/20; G10L 25/63; G10L 25/21; H04N 5/23219; H04N 21/45; H04N 21/466
See application file for complete search history.

(56) References Cited

U.S. PATENT DOCUMENTS

| | | | | |
|---|---|---|---|---|
| 2015/0204559 | A1* | 7/2015 | Hoffberg | F24F 11/30 700/278 |
| 2015/0338915 | A1* | 11/2015 | Publicover | G06F 21/316 345/633 |
| 2016/0170975 | A1* | 6/2016 | Jephcott | G06Q 10/10 704/3 |
| 2016/0345060 | A1* | 11/2016 | Marci | H04N 21/812 |
| 2017/0123487 | A1* | 5/2017 | Hazra | G06F 3/017 |
| 2017/0367590 | A1* | 12/2017 | Sebe | A61B 5/0077 |
| 2018/0253840 | A1* | 9/2018 | Tran | G16H 40/63 |

OTHER PUBLICATIONS

Affective Computing and the Impact of Gender and Age (Year: 2016).*
Comparison and Efficacy of Synergistic Intelligent Tutoring Systems with Human Physiological Response (Year: 2019).*
Multimodal sentiment analysis to explore the structure of emotions; Hu and Flaxman;KDD'18; Aug. 19-23, 2018.
Speech emotion classification and public speaking skill assessment; Pfister and Robinson.
Real-time recognition of affective states from nonverbal features of speech and its application for public speaking skill analysis; Pfister and Robinson; IEEE Transactions; vol. 2, No. 2:Apr.-Jun. 2011; pp. 66-78.
Multimodal sentiment intensity analysis in videos: Facial gestures and verbal messages; Amir Zadeh et al;IEEE Intelligent Systems; Nov./Dec. 2016; pp. 82-88.
Pearl: An interactive visual analytic tool for understanding personal emotion style derived from social media; Jian Zhao et al; IEEE Symposium, Nov. 9-14, 2014; Paris, France; pp. 203-212.

* cited by examiner

| Word View | | Search and Filter | Complete: |
|---|---|---|---|
| Word | Frequency | FaceInfo | |
| a | 31 | | |
| few | 1 | | |
| years | 1 | | |
| ago | 2 | | |
| %HESITATION | 5 | | |
| I | 59 | | |
| got | 2 | | |
| one | 9 | | |
| of | 14 | | |
| these | 1 | | |

FIG. 11

SYSTEM AND METHOD FOR VISUAL ANALYSIS OF EMOTIONAL COHERENCE IN VIDEOS

PRIORITY

This application claims priority to U.S. Provisional Patent Application Ser. No. 62/898,199 filed on 10 Sep. 2019 and incorporates the same provisional application herein for all purposes.

FIELD OF THE INVENTION

The invention relates to a system and a computer implemented method for visual analysis of emotional coherence in videos and, particularly, but not exclusively to presentation videos.

BACKGROUND OF THE INVENTION

Emotions play a key role in human communication and public presentations including public speaking. Much of recent literature advocates emotional expressions that can improve audience engagement and lead to successful delivery as discussed in reference C. Gallo. *Talk like TED: the 9 public-speaking secrets of the world's top minds*. St. Martin's Press, 2014. As humans express emotions through multiple behavioral modalities such as facial and vocal changes and gestures, emotional coherence across those modalities has significant effects on the perception and attitudes of audiences as described in reference C. Darwin and K. Lorenz. *The Expression of the Emotions in Man and Animals*. Phoenix Books. University of Chicago Press, 1965. Therefore, exploring multimodal emotions and their coherence is of great value for understanding emotional expressions in, for example, presentations, and improving presentation skills. Nevertheless, existing research in multimedia, as described in references T. Pfister and P. Robinson. *Speech emotion classification and public speaking skill assessment. In International Workshop on Human Behavior Understanding*, pp. 151-162. Springer, 2010, T. Pfister and P. Robinson. *Real-time recognition of affective states from nonverbal features of speech and its application for public speaking skill analysis. IEEE Transactions on Affective Computing*, 2(2):66-78, 2011 and V. Ramanarayanan, C. W. Leong, L. Chen, G. Feng, and D. Suendermann-Oeft. *Evaluating speech, face, emotion and body movement time-series features for automated multimodal presentation scoring. In Proceedings of the 2015 ACM on International Conference on Multimodal Interaction*, pp. 23-30. ACM, 2015, mainly focuses on integrating multimodal features to recognize and analyze the overall emotion in presentations. Thus, they are insufficient for capturing the scenarios with incoherent emotions expressed through each modality, which can occur inadvertently as discussed in references R. Reisenzein, M. Studtmann, and G. Horstmann. *Coherence between emotion and facial expression: Evidence from laboratory experiments. Emotion Review*, 5(1):16-23, 2013 and P.-w. Yeh, E. Geangu, and V. Reid. *Coherent emotional perception from body expressions and the voice. Neuropsychologia*, 91:99-108, 2016 or deliberately e.g. deadpan humor. Manually checking and exploring presentation videos is often tedious and time-consuming and there still lacks an effective tool to help users conduct an efficient and in-depth multi-level analysis.

On the subject of emotional modalities, one central tenet of emotion theories is that emotional expressions involve different modalities such as facial and vocal behavior as discussed in reference C. Darwin and K. Lorenz. Within this framework, emotional coherence among those channels plays an important role in human communication. Many psychological experiments, as discussed in references V. I. Müller, U. Habel, B. Derntl, F. Schneider, K. Zilles, B. L Turetsky, and S. B. Eickhoff. *Incongruence effects in cross-modal emotional integration*, C. Tsiourti, A. Weiss, K. Wac, and M. Vincze. *Multimodal integration of emotional signals from voice, body, and context: Effects of (in) congruence on emotion recognition and attitudes towards robots. International Journal of Social Robotics*, pp. 1-19, 2019, and M. Weisbuch, N. Ambady, A. L. Clarke, S. Achor, and J. V.-V. Weele. *On being consistent: The role of verbal-nonverbal consistency in first impressions. Basic and Applied Social Psychology*, 32(3):261-268, 2010, have demonstrated the hindering effect of incoherent expressions on emotional perception and recognition by others. Correspondingly, focusing on more modalities than the basic facial expressions alone could enable the discovery of underlying emotional states as described in reference H. Aviezer, Y. Trope, and A. Todorov. *Body cues, not facial expressions, discriminate between intense positive and negative emotions. Science*, 338(6111):1225-1229, 2012. Despite such promising benefits, recent psychological research debates that the coherence across emotional modalities is not necessarily high and surprisingly weak for certain types of emotions as discussed in references J.-M. Fernández-Dols and C. Crivelli. *Emotion and expression: Naturalis-tic studies. Emotion Review*, 5(1):24-29, 2013 and R. Reisenzein, M. Studtmann, and G. Horstmann. *Coherence between emotion and facial expression: Evidence from laboratory experiments. Emotion Review*, 5(1):16-23, 2013. For example, Reisenzein et al. found that facial expressions might not co-occur with experienced surprise and disgust. These ongoing debates motivate the novel developments of the present invention in multimodal emotional analysis.

In line with psychological experimental research, research in computational emotional analysis has increasingly evolved from traditional unimodal prospective to more complex multimodal perspectives as discussed in reference S. Poria, E. Cambria, R. Bajpai, and A. Hussain. *A review of affective computing: From unimodal analysis to multimodal fusion. Information Fusion*, 37:98-125, 2017. A great amount of work exemplified by references S. Poria, E. Cambria, A. Hussain, and G.-B. Huang. *Towards an intelligent framework for multimodal affective data analysis. Neural Networks*, 63:104-116, 2015 and M. Soleymani, M. Pantic, and T. Pun. *Multimodal emotion recognition in response to videos. IEEE Transactions on Affective Computing*, 3(2):211-223, 2012 is focused on utilizing multimodal features to enhance emotion recognition. This line of work examines different combinations of feature modalities and identifies those which do not contribute to recognition performance. Some work as described in references H. Ranganathan, S. Chakraborty, and S. Panchanathan. *Multimodal emotion recognition using deep learning architectures. In 2016 IEEE Winter Conference on Applications of Computer Vision (WACV)*, pp. 1-9. IEEE, 2016 and P. Tzirakis, G. Trigeorgis, M. A. Nicolaou, B. W. Schuller, and S. Zafeiriou. *End-to-end multimodal emotion recognition using deep neural networks. IEEE Journal of Selected Topics in Signal Processing*, 11(8):1301-1309, 2017 employs deep architectures to capture complex relationships among multimodal features; however, they do not explicitly account for their coherence and thus are insufficient in detailed exploration.

Emotional visualization has become a prominent topic of research over the last decade. Most effort has focused on analyzing emotions extracted from text data such as documents as described in reference M. L. Gregory, N. Chinchor, P. Whitney, R. Carter, E. Hetzler, and A Turner. *User-directed sentiment analysis: Visualizing the affective content of documents. In Proceedings of the Workshop on Sentiment and Subjectivity in Text*, pp. 23-30. Association for Computational Linguistics, 2006, social media posts as discussed in references R. Kempter, V. Sintsova, C. Musat, and P. Pu. *Emotionwatch: Visualizing fine-grained emotions in event-related tweets. In Eighth International AAAI Conference on Weblogs and Social Media*, 2014 and J. Zhao, L. Gou, F. Wang, and M. Zhou. *Pearl: An interactive visual analytic tool for understanding personal emotion style derived from social media. In Proceedings of IEEE Conference on Visual Analytics Science and Technology*, pp. 203-212. IEEE, 2014, and online reviews as discussed in references C. Chen, F. Ibekwe-SanJuan, E. SanJuan, and C. Weaver. *Visual analysis of conflicting opinions. In 2006 IEEE Symposium On Visual Analytics Science And Technology*, pp. 59-66. IEEE, 2006, D. Oelke, M. Hao, C. Rohrdantz, D. A. Keim, U. Dayal, L.-E. Haug, and H. Janetzko. *Visual opinion analysis of customer feedback data. In 2009 IEEE Symposium on Visual Analytics Science and Technology*, pp. 187-194. IEEE, 2009 and Y. Wu, F. Wei, S. Liu, N. Au, W. Cui, H. Zhou, and H. Qu. *Opinionseer: interactive visualization of hotel customer feedback. IEEE transactions on visualization and computer graphics*, 16(6):1109-1118, 2010. For instance, Zhao et al., analyzes personal emotional styles by extracting and visualizing emotional information. At a larger scale, Kempter et al., proposes "EmotionWatch" which summarizes and visualizes public emotional reactions. Less research has addressed facial and audio emotional expressions, which often involve more rapid evolution and smaller time granularity. Reference G. K. Tam, H. Fang, A. J. Aubrey, P. W. Grant, P. L. Rosin, D. Marshall, and M. Chen. *Visualization of time-series data in parameter space for understanding facial dynamics. In Computer Graphics Forum*, vol. 30, pp. 901-910. Wiley Online Library, 2011 utilizes parallel coordinates to explore facial expressions in measurement space, supporting the design of analytical algorithms. Those systems are mainly centered on unimodal emotions without considering information from other modalities.

Few systems have been proposed to assist in emotional analysis from a multimodal perspective Zadeh et al., reference A. Zadeh, R. Zellers, E. Pincus, and L.-P. Morency. *Multimodal sentiment intensity analysis in videos: Facial gestures and verbal messages. IEEE Intelligent Systems*, 31(6):82-88, 2016, utilizes histograms to visualize the relationships of sentiment intensity between visual gestures and spoken words in videos. More recently, Hu et al., reference A. Hu and S. Flaxman. *Multimodal sentiment analysis to explore the structure of emotions. In Proceedings of the 24th ACM SIGKDD International Conference on Knowledge Discovery & Data Mining*, pp. 350-358. ACM, 2018, inferred latent emotional states from text and images of social media posts and visualized their correlations. Nevertheless, their visual approaches only encode overall statistics, lacking an in-depth analysis and visualizations of emotional states and changes at different levels of detail.

Having regard to multimedia visual analytics, a number of visual analytic systems have been proposed to assist in video analysis and knowledge discovery. One major challenge is the granularity level which varies from the video and clip level to the word and frame level. On the one hand, many systems summarize the video content into temporal variables and represent them by line-based as discussed in references M. Hoeferlin, B. Hoeferlin, G. Heidemann, and D. Weiskopf. *Interactive schematic summaries for faceted exploration of surveillance video. IEEE transactions on multimedia*, 15(4):908-920, 2013 and A. H. Meghdadi and P. Irani. *Interactive exploration of surveillance video through action shot summarization and trajectory visualization. IEEE Transactions on Visualization and Computer Graphics*, 19(12):2119-2128, 2013 or tabular charts as discussed in references K. Higuchi, R. Yonetani, and Y. Sato. *Egoscanning: quickly scanning first-person videos with egocentric elastic timelines. In Proceedings of the 2017 CHI Conference on Human Factors in Computing Systems*, pp. 6536-6546. ACM, 2017 and D. Ponceleon and A. Dieberger. *Hierarchical brushing in a collection of video data. In Proceedings of the 34th Annual Hawaii International Conference on System Sciences*, pp. 8-pp. IEEE, 2001 to enable analysis at the video level. Hierarchical brushing is often introduced to extend analysis to finer levels as discussed in reference K. Kurzhals, M. John, F. Heimerl, P. Kuznecov, and D. Weiskopf *Visual movie analytics. IEEE Transactions on Multimedia*, 18(11):2149-2160, 2016. While they support an effective visual exploration of the temporal overview and dynamics, they provide scant support for performing analytic tasks such as cluster analysis. On the other hand, some approaches as discussed in references J. Matejka, T. Grossman, and G. Fitzmaurice. *Video lens: rapid playback and exploration of large video collections and associated metadata. In Proceedings of the 27th annual ACM symposium on User interface software and technology*, pp. 541-550. ACM, 2014 and B. Renoust, D.-D. Le, and S. Satoh. *Visual analytics of political networks from face-tracking of news video. IEEE Transactions on Multimedia*, 18(11):2184-2195, 2016 discard the temporal information and consider short clips or frames to be basic analysis units. For instance, Renoust et al. utilizes a graph design to visualize the concurrence of people within videos.

Modalities pose another challenge on multimedia mining as discussed in references V. Vijayakumar and R. Nedunchezhian. *A study on video data mining. International journal of multimedia information retrieval*, 1(3):153-172, 2012. S. Vijayarani and A. Sakila. *Multimedia mining research-an overview and S. Vijayarani and A. Sakila. Multimedia mining research-an overview. International Journal of Computer Graphics & Animation*, 5(1):69, 2015. Exploring the synergy among modalities could reveal higher-level semantic information as discussed in reference P. Barros and S. Wermter. *Developing crossmodal expression recognition based on a deep neural model. Adaptive behavior*, 24(5): 373-396, 2016. While many computational methods have been proposed to support cross-modal analysis, little research has specifically looked at visualization approaches. Stein et al., reference M. Stein, H. Janetzko, A. Lamprecht, T. Breitkreutz, P. Zimmermann, B. Goldlücke, T. Schreck, G. Andrienko, M. Grossniklaus, and D. A. Keim. *Bring it to the pitch: Combining video and movement data to enhance team sport analysis. IEEE transactions on visualization and computer graphics*, 24(1):13-22, 2018, proposes a computer vision-based approach to map data abstraction onto the frames of soccer videos. Reference X. Xie, X. Cai, J. Zhou, N. Cao, and Y. Wu. *A semantic-based method for visualizing large image collections. IEEE transactions on visualization and computer graphics*, 2018 suggests a co-embedding method to project images and associated semantic keywords to a 2D space. Reference A. Wu and H. Qu. *Multimodal analysis of video collections: Visual exploration of presen-*

*tation techniques in ted talks. IEEE transactions on visualization and computer graphics*, 2018 proposes a visual analytics system to explore the concurrence of events in visual and linguistic modalities. These systems only capture implicit or simple relationships among different modalities and are therefore insufficient to promote in-depth analysis.

Therefore, an analysis tool and method for systematically exploring and interpreting emotional coherence across behavioral modalities is desired to gain deeper insights into emotional expressions. To achieve this, it is required to provide an improved data processing system and method as defined by the appended claims.

OBJECTS OF THE INVENTION

An object of the invention is to mitigate or obviate to some degree one or more problems associated with known methods of exploring and interpreting emotional coherence across behavioral modalities in video and associated data.

The above object is met by the combination of features of the main claims; the sub-claims disclose further advantageous embodiments of the invention.

Another object of the invention is to provide an improved data processing system and method for processing a video signal.

Another object of the invention is to provide an improved data processing system and method for selecting a video.

Another object of the invention is to provide an improved data processing system and method for searching a repository of videos.

One skilled in the art will derive from the following description other objects of the invention. Therefore, the foregoing statements of object are not exhaustive and serve merely to illustrate some of the many objects of the present invention.

SUMMARY OF THE INVENTION

The present invention differs from previous work in at least two aspects. First, it is not assumed that emotions impose coherence on different behavioral modalities according to recent evidence from psychological research. Instead, state-of-the-art methods are adopted to extract emotions from different modalities and explicitly examine their coherence. Second, visual and machine-based analytics are used to bring in human expertise in interpreting and analyzing true emotions from videos, which provides a more detailed analysis.

In a first main aspect, the invention provides a computer implemented method of processing a video signal, comprising the steps of: detecting a human face displayed in the video signal and extracting physiological, biological, or behavior state information from the displayed face at a first level of granularity of the video signal; processing any two or more of: (i) a script derived from or associated with the video signal to extract language tone information from said script at a first level of granularity of the script; (ii) an audio signal derived from or associated with the video signal to derive behavior state information from said audio signal at a first level of granularity of the audio signal; and (iii) a video image derived from the video signal to detect one or more human gestures of the person whose face is displayed in the video signal; and merging said physiological, biological, or behavior state information extracted from the video signal with two or more of: (i) the language tone information extracted from the script; (ii) the behavior state information derived from the audio signal; and (iii) the one or more human gestures derived from the video image; wherein said merging step is based on behavior state categories and/or levels of granularity.

In a second main aspect, the invention provides a system for processing a video signal, comprising: a face detection module to detect a human face displayed in the video signal and extract physiological, biological, or behavior state information from the displayed face at a first level of granularity of the video signal; and two or more of: (i) a tone analyzer module to process a script derived from or associated with the video signal to extract language tone information from said script at a first level of granularity of the script; (ii) an audio signal analysis module to process an audio signal derived from or associated with the video signal to derive behavior state information from said audio signal at a first level of granularity of the audio signal; (iii) a video image analysis module to process a video image derived from the video signal to detect one or more human gestures of the person whose face is displayed in the video signal; and a data processor to merge said physiological, biological, or behavior state information extracted from the video signal with two or more of: (i) the language tone information extracted from the script; (ii) the behavior state information derived from the audio signal; and (iii) the one or more human gestures derived from the video image; wherein the data processor is configured to merge said information based on behavior state categories and/or levels of granularity.

In a third main aspect, the invention provides a non-transitory computer readable medium storing machine-readable instructions executable by a processor to configure a signal processing system to perform the method of the first main aspect of the invention.

In a fourth main aspect, the invention provides a method of selecting a video, the method comprising: displaying data for each of a plurality of videos, said data for each video including data indicative of a degree of emotion incoherence between a plurality of modalities of said video; receiving a user selection of one of the displayed videos; for the user selected video, performing one or more of: playing said video in response to user inputs; and/or displaying data representative of connections between the plurality of modalities of said video at a first level of granularity of one of said plurality of modalities.

In a fifth main aspect, the invention provides a system for selecting a video, comprising a screen displaying data for each of a plurality of videos, said data for each video including data indicative of a degree of emotion incoherence between a plurality of modalities of said video; an interface for receiving a user selection of one of the displayed videos; and a data processor configured to, in response to receiving the user selection, performing one or more of: playing said video; and/or displaying data representative of connections between the plurality of modalities of said video at a first level of granularity of one of said plurality of modalities.

In a sixth main aspect, the invention provides a non-transitory computer readable medium storing machine-readable instructions executable by a processor to configure a signal processing system to perform the method of the fourth main aspect of the invention.

In a seventh main aspect, the invention provides a computer implemented method of searching a repository of videos, the method comprising: storing data for each of a plurality of videos, said data for each video including data indicative of a degree of emotion incoherence between a plurality of modalities of said video; receiving a user search input; based on the user search input, identifying one or more videos matching or closely matching said user search put; and displaying data defining a list of videos identified as matching or closely matching said user search input.

In an eighth main aspect, the invention provides a system for searching a repository of videos, the system comprising a repository for storing data for each of a plurality of videos, said data for each video including data indicative of a degree of emotion incoherence between a plurality of modalities of said video; a device communicatively connect to said repository for receiving a user search input; a data processor configured, on receiving said user search input, to identify one or more videos matching or closely matching said user search put; and a display for displaying data defining a list of videos identified as matching or closely matching said user search input.

In a ninth main aspect, the invention provides a non-transitory computer readable medium storing machine-readable instructions executable by a processor to configure a signal processing system to perform the method of the seventh main aspect of the invention.

BRIEF DESCRIPTION OF THE DRAWINGS

The foregoing and further features of the present invention will be apparent from the following description of preferred embodiments which are provided by way of example only in connection with the accompanying figures, of which:

FIG. 11 provides an enlarged and more detailed view of a 'word view' part of FIG. 3.

DESCRIPTION OF PREFERRED EMBODIMENTS

Figure 1:
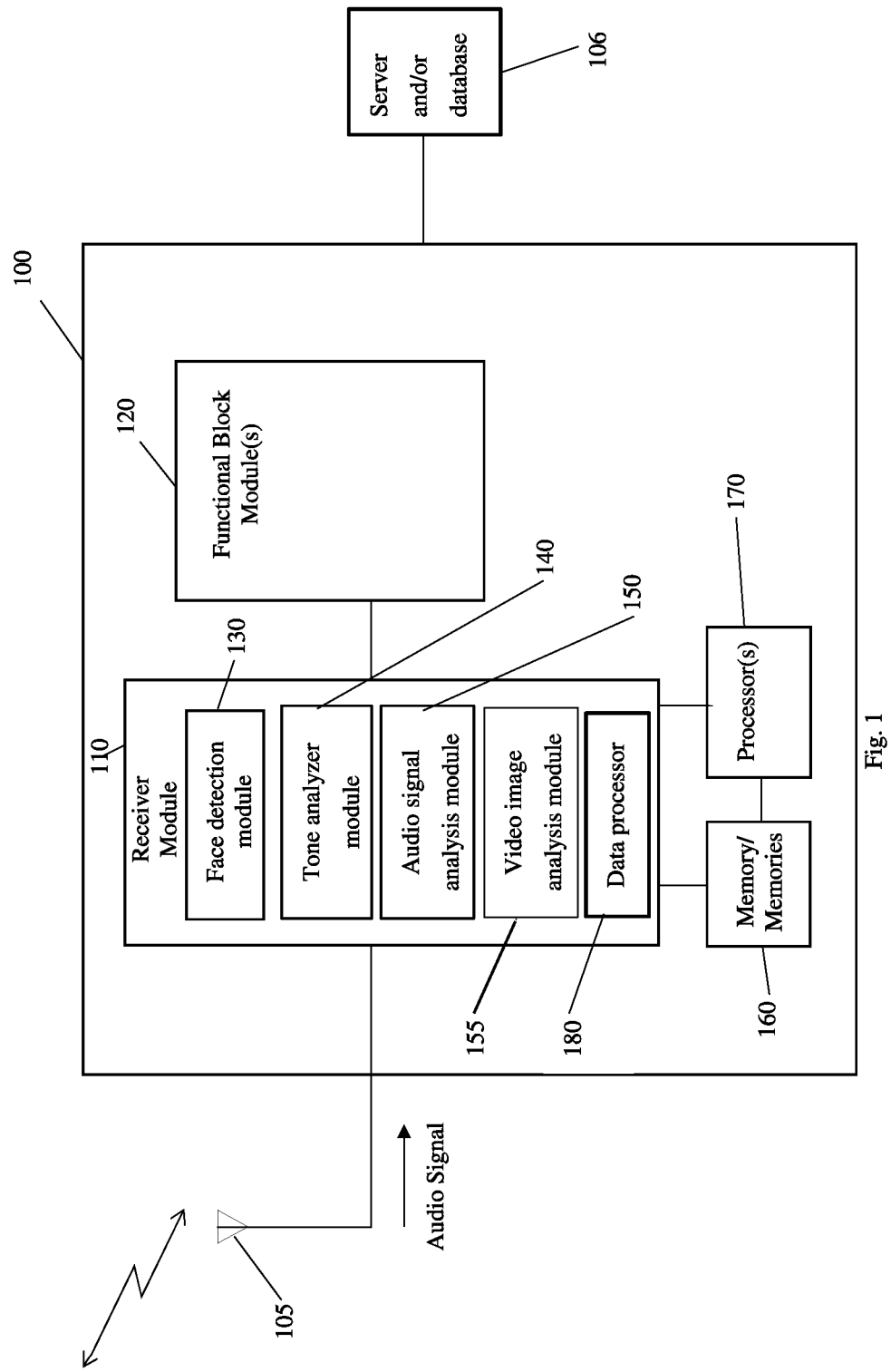
FIG. 1 is a block schematic diagram of a signal processing system in accordance with the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Visual analytics have been introduced into emotional analysis to ease the exploration of complex and multidimensional emotion data. Much effort has focused on analyzing emotions from a single modality such as text data as discussed in references C. Chen, F. Ibekwe-SanJuan, E. SanJuan, and C. Weaver; D. Oelke, M. Hao, C. Rohrdantz, D. A. Keim, U. Dayal, L.-E. Haug, and H. Janetzko; Y. Wu, F. Wei, S. Liu, N. Au, W. Cui, H. Zhou, and H. Qu; and J. Zhao, L. Gou, F. Wang, and M. Zhou, and to a much less extent, videos as discussed in reference Tam et Al or audios as discussed in reference C.-H. Chen, M.-F. Weng, S.-K. Jeng, and Y.-Y. Chuang. *Emotion-based music visualization using photos. In International Conference on Multi-media Modeling*, pp. 358-368. Springer, 2008. While their visualization approaches demonstrate success in analyzing the corresponding emotional modality, it is difficult to integrate them for multimodal analysis due to their different time granularity and dynamic variation. In addition, existing systems for multimodal emotional analysis such as references A. Hu and S. Flaxman and A. Zadeh, R. Zellers, E. Pincus, and L.-P. Morency only encode overall statistics, providing scant support for in-depth analysis such as identifying dynamic changes of emotional coherence and inferring the underlying emotion states (e.g. deadpan humor) from videos. Moreover, those systems do not account for different levels of details, which may result in overlooking important emotional patterns. In summary, due to the multimodality and varying granularity of emotional behavior in videos, it is challenging to conduct simultaneous emotional analysis across different modalities and explore the emotional coherence.

To address the above challenges, work leading to the present invention has been conducted with two professional presentation coaches to innovate novel and effective automatic visual analytics techniques for analyzing multimodal emotions in videos, especially presentation videos. Following a user-centered design process, the present invention derives a set of visualization tasks based on interviews and discussions with the experts. Then, the invention proposes an interactive visualization system to automatically analyze emotional states and coherence derived from text, facial, and audio modalities at three levels of detail. A channel view summarizes coherence statistics, and a projection view provides an overview of their dynamic changes at a selected or predetermined level such as a sentence level. Once sentences of interest are selected, a detail view enables exploration of emotional states and their temporal variations along with supplementary information such as voice pitches. Rich interactions are provided to facilitate browsing the videos and inferring emotional states of the speaker. Two usage scenarios with TED Talks and expert interviews demonstrate the effectiveness and usefulness of this novel approach.

FIG. 1 shows an exemplary embodiment of a signal processing system 100 in accordance with concepts of the present invention. In the illustrated embodiment, the signal processing system 100 comprises a computer processing device such as a communication equipment (e.g. a smart phone), a tablet computer, a laptop computer, a personal computer (PC), or the like, although any suitable data processing device or system may be utilized. The signal processing system 100 may be connected via a communication network to a server and/or to a database 106 or the like, although this is not essential to the implementation of the invention. The communication network may comprise a wireless network, e.g. a wireless cellular network, a wired network, the internet or any combination of the foregoing.

The signal processing system 100 may comprise a plurality of functional blocks for performing various functions thereof. For example, the signal processing system 100 may include a receiver module 110 providing received signal processing and/or configured to provide received signals and/or information extracted therefrom to functional block module(s) 120 such as may comprise various data sink, control element(s), user interface(s), etc. Although receiver module 110 is described as providing received signal processing, it will be appreciated that this functional block may be implemented as a transceiver providing both transmitted and received signal processing via antenna 105 and/or another type of system input, although it will be understood that video signals in the form of video clips may be received or inputted to the receiver module 110 of the signal processing system 100 by suitable means familiar to one skilled in the art. Furthermore, it will be appreciated that it is not essential to the implementation of the aspects of the invention that the signal processing system 100 is able to receive and/or transmit signals. The signal processing system 100 may comprise a stand-alone device or system. Irrespective of the presence or particular configuration of receiver module 110, embodiments may include: a face detection module 130 to detect a human face displayed in a video signal for extracting physiological, biological, or behavior state information from the displayed face at a first level of granularity of the video signal; a tone analyzer module 140 to process a script derived from or associated with the video signal to extract language tone information from said script at a first level of granularity of the script; an audio signal analysis module 150 to process an audio signal derived from or associated with the video signal to derive behavior state information from said audio signal at a first level of granularity of the audio signal; a video image analysis module 155 to process a video image derived from the video signal to detect one or more human gestures of the person whose face is displayed in the video signal; and a data processor 180 to merge said physiological, biological, or behavior state information extracted from the video signal with two or more of: (i) the language tone information extracted from the script; (ii) the behavior state information derived from the audio signal; and (iii) the one or more human gestures derived from the video image; wherein the data processor 180 is configured to merge said information based on behavior state categories and/or levels of granularity.

Although the face detection module 130, the tone analyzer module 140, the audio signal analysis module 150, the video image analysis module 155 and the data processor 180 are shown as being deployed as part of the receiver module 110 (e.g. comprising a portion of the receiver module control and logic circuits), there is no limitation to such a deployment configuration according to the concepts of the invention. For example, each of the face detection module 130, the tone analyzer module 140, the audio signal analysis module 150, the video image analysis module 155 and the data processor 180 may be deployed as respective functional blocks of the signal processing system 100 that is distinct from, but connected to, the receiver module 110 if present. Each of the face detection module 130, the tone analyzer module 140, the audio signal analysis module 150, the video image analysis module 155 and the data processor 180 may, for example, be separately implemented using logic circuits and/or executable code/machine readable instructions stored in a memory 160 of the signal processing system 100 for execution by a processor 170 to thereby perform functions as described herein. For example, the executable code/machine readable instructions may be stored in one or more memories 160 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 160 may comprise processor-readable memories for use with respect to one or more processors 170 operable to execute code segments of any of the face detection module 130, the tone analyzer module 140, the audio signal analysis module 150, the video image analysis module 155 and the data processor 180 and/or to utilize data provided thereby to perform functions of the signal processing system 100 as described herein. Additionally, or alternatively, each of the face detection module 130, the tone analyzer module 140, the audio signal analysis module 150, the video image analysis module 155 and the data processor 180 may comprise one or more special purpose processors (e.g. application specific integrated circuit (ASIC), field programmable gate array (FPGA), graphics processing unit (GPU), and/or the like configured to perform functions of the signal processing system 100 as described herein.

To implement the method according to the main aspects of the invention, a series of data processing steps are conducted to extract behavior state information such as and preferably comprising emotion information from visual, audio, and text modalities of the video signal. Methods are applied to extract such information from each modality independently. Then, the data comprising the extracted information from said modalities are fused based on their semantic meanings and aligned at different levels of time granularity.

More specifically, in the video signal processing method according to the first main aspect of the invention, a first step is to use the face detection module 130 to detect a human face displayed in the video signal and extract physiological, biological, or behavior state information from the displayed face at a first level of granularity, e.g. a video frame level, of a received or inputted video signal. The video signals to be processed preferably comprise digital video clips of human speeches, preferably in digital format, but, for some embodiments, may include synthesized speeches, e.g. speeches generated from texts associated with or derived from the video signal. The face detection module 130 therefore preferably includes a speech synthesis or speech analysis module. The face detection module 130 may, in some embodiments, comprise an existing face detection module such as, for example, the Microsoft™ Azure Face API to perform face detection, grouping, authentication and emotion recognition in the video signal. The preponderant face group in the video signal is considered to be the speaker, and it is merged with other face groups upon facial authentication, because the same speaker might fall into several groups. The data output of the face detection module 130 preferably includes a set of emotions (i.e., anger, contempt, disgust, fear, happiness, neutral, sadness, and surprise) with confidence values for the speaker in each video frame, i.e. at the first level of granularity of the video signal.

The method then includes two or more of the following steps three steps (i), (ii) and (iii):

(i) To use the tone analyzer module 140 to process a script or text derived from or associated with the video signal to extract language tone information from said script at a first level of granularity of the script. The script or text derived from or associated with the video signal may comprise the predefined, human-labelled text segments obtainable from the TED website (https://www.ted.com/talks) as the script/text data input as each forms a small semantic unit containing a few sentences with similar emotions. The tone analyzer module 140 may, in some embodiments, comprise an existing tone analyzer module such as the IBM™ Watson Tone Analyzer API configured to extract emotional tones including anger, disgust, fear, happiness, sadness, and analytical. The last tone is marked as "neutral" for consistency.

(ii) To use the audio signal analysis module 150 to process an audio signal derived from or associated with the video signal to derive behavior state information from said audio signal at a first level of granularity of the audio signal. Preferably, this comprises an initial step of segmenting the audio signal in line with the aforementioned transcript segmentation such that the first level of granularity of the audio signal comprises the first level of granularity of the script. A neural network as described in reference K. Ryokai, E. Durán López, N. Howell, J. Gillick, and D. Bamman. *Capturing, representing, and interacting with laughter. In Proceedings of the 2018 CHI Conference on Human Factors in Computing Systems*, p. 358. ACM, 2018 may be used to usefully filter out any audio clips containing laughter, because it has been observed that such clips severely affect the emotion recognition results. Preferably, the Mel Frequency Cepstral Coefficient (MFCC) is computed, a feature usually used for audio emotion recognition, from extracted clips, but other techniques can be used to extract power spectrum data from the audio signal such as, for example, Audio-Textual Emotion Recognition Based on Improved Neural Networks (https://doi.org/10.1155/2019/2593036 or https://www.hindawi.com/journals/mpe/2019/2593036/), Convolutional MKL Based Multimodal Emotion Recognition and Sentiment Analysis (10.1109/ICDM.2016.0055 or https://ieeexplore.ieee.or/document/7837868), A new approach of audio emotion recognition (http://dx.doi.org/10.1016/i.eswa.2014.03.026 or https://www.sciencedirect.com/science/article/abs/pii/S0957417414001638?via%3Dihub), or Multimodal Language Analysis in the Wild: CMU-MOSEI Dataset and Interpretable Dynamic Fusion Graph (10.18653/v1/P18-1208 or https://www.aclweb.org/anthology/P18-1208/). Then, these are fed into a pre-trained base-line model such as described in reference P. Barros and S. Wermter. *Developing crossmodal expression recognition based on a deep neural model. Adaptive behavior*, 24(5): 373-396, 2016 implemented for the speech emotion recognition on the RAVDESS dataset discussed in reference S. R. Livingstone and F. A. Russo. *The ryerson audio-visual database of emotional speech and song (ravdess): A dynamic, multimodal set of facial and vocal expressions in north american english. PLOS ONE*, 13(5):1-35, 05 2018. doi: 10.1371/journal.pone.0196391, although other datasets may be utilized such as, for example, the IEMOCAP dataset (https://sail.usc.edu/iemocap/), the AIBO dataset (https://www5.cs.fau.de/en/our-team/steidl-stefan/fau-aibo-emotion-corpus/), or the CMU-Multimodal SDK dataset (https://github.com/A2Zadeh/CMU-MultimodalSDK). The output preferably comprises seven detected emotions, including anger, disgust, fear, happiness, neutral, sadness, and surprise.

Other datasets which may be utilized are provided in Table 1 below:

TABLE 1

Comparison of the CMU-MOSEI dataset with previous sentiment analysis and emotion recognition datasets. #S denotes the number of annotated data points. #Sp is the number of distinct speakers. Mod indicates the subset of modalities present from {(l)anguage, (v)ision, (a)udio}. Sent and Emo columns indicate presence of sentiment and emotion labels. TL denotes the total number of video hours.

| Dataset | # S | # Sp | Mod | Sent | Emo | TL (hh:min:ss) |
|---|---|---|---|---|---|---|
| CMU-MOSEI | 23,453 | 1,000 | {l, v, a} | ✓ | ✓ | 65:53:36 |
| CMU-MOSI | 2,199 | 98 | {l, v, a} | ✓ | X | 02:36:17 |
| ICT-MMMO | 340 | 200 | {l, v, a} | ✓ | X | 13:58:29 |
| YouTube | 300 | 50 | {l, v, a} | ✓ | X | 00:29:41 |

TABLE 1-continued

Comparison of the CMU-MOSEI dataset with previous sentiment analysis and emotion recognition datasets. #S denotes the number of annotated data points. #Sp is the number of distinct speakers. Mod indicates the subset of modalities present from {(l)anguage, (v)ision, (a)udio}. Sent and Emo columns indicate presence of sentiment and emotion labels. TL denotes the total number of video hours.

| Dataset | # S | # Sp | Mod | Sent | Emo | TL (hh:min:ss) |
|---|---|---|---|---|---|---|
| MOUD | 400 | 101 | {l, v, a} | ✓ | X | 00:59:00 |
| SST | 11,855 | — | {l} | ✓ | X | — |
| Cornell | 2,000 | — | {l} | ✓ | X | — |
| Large Movie | 25,000 | — | {l} | ✓ | X | — |
| STS | 5,513 | — | {l} | ✓ | X | — |
| IEMOCAP | 10,000 | 10 | {l, v, a} | X | ✓ | 11:28:12 |
| SAL | 23 | 4 | {v, a} | X | ✓ | 11:00:00 |
| VAM | 499 | 20 | {v, a} | X | ✓ | 12:00:00 |
| VAM-faces | 1,867 | 20 | {v} | X | ✓ | — |
| HUMAINE | 50 | 4 | {v, a} | X | ✓ | 04:11:00 |
| RECOLA | 46 | 46 | {v, a} | X | ✓ | 03:50:00 |
| SEWA | 538 | 408 | {v, a} | X | ✓ | 04:39:00 |
| SEMAINE | 80 | 20 | {v, a} | X | ✓ | 06:30:00 |
| AFEW | 1,645 | 330 | {v, a} | X | ✓ | 02:28:03 |
| AM-FED | 242 | 242 | {v} | X | ✓ | 03:20:25 |
| Mimicry | 48 | 48 | {v, a} | X | ✓ | 11:00:00 |
| AFEW-VA | 600 | 240 | {v, a} | X | ✓ | 00:40:00 |

(iii) To use the video image analysis module 155 to process a video image derived from the video signal to detect one or more human gestures of the person whose face is displayed in the video signal. Detecting one or more human gestures from the video image preferably includes extracting physiological, biological, or behaviour state information from the detected one or more human gestures. The step of detecting the one or more human gestures may comprise detecting one or more body gestures of the person whose face is displayed in the video signal. The video image derived from the video signal to detect one or more human gestures may comprise any of a single frame still image derived from the video signal; multiple frames from the video signal; a portion of the video signal; and the whole of the video signal.

In a final step of the method of the first main aspect, the data processor 180 is used to merge said physiological, biological, or behavior state information extracted from the video signal with two or more of: (i) the language tone information extracted from the script; (ii) the behavior state information derived from the audio signal; and (iii) the one or more human gestures derived from the video image; wherein the data processor 180 is configured to merge said information based on behavior state categories and/or levels of granularity. Preferably, the physiological, biological, or behavior state information extracted from the video signal, the language tone information extracted from the script, the behavior state information derived from the audio signal, and the behavior state information derived from the video image comprise emotion data.

More particularly, the data processor 180 fuses some of the extracted emotion data based on their categories and according to different time granularities. Multi-modal emotional categories are preferably mapped into a uniform category to facilitate data analysis. The category is the union of all emotion categories for each modality, which is taken to contain eight emotions (i.e. anger, contempt, disgust, fear, happiness, neutral, sadness, and surprise). For multi-level fusion, three levels time granularity (i.e., the sentence level, the word level and the video signal frame level) are considered based on our discussions with the domain experts. In the previous steps, text and audio emotions have already been aligned at the sentence level, while facial emotions have been extracted frame by frame and human gestures extracted from one or more video images or parts of the video signal. To conduct sentence-level fusion, the most frequent facial emotion in each sentence is calculated to represent its predominant emotion. As for word-level alignment, since the start and end times of each word have been detected by using the tone analyzer module 140, the facial, text, audio emotions, and/or human gesture emotions can easily be mapped to each word based on its detected time period. Preferably, the human gesture emotions are human body gesture emotions.

To explore the method of the invention with real data, 30 TED™ Talk videos were collected to explore emotional coherence of these presentation videos. Each video was about 10 minutes long and of high quality with more than one million online reviews.

In the some of the examples in the following description, data processor 180 merges all the physiological, biological, or behavior state information extracted from the displayed face in the video signal with all of the language tone information extracted from the script, the behavior state information derived from the audio signal, and the one or more human gestures derived from the video image, but it will be understood that, in some embodiments, the data processor 180 is configured to merge said physiological, biological, or behavior state information extracted from the displayed face in the video signal with two or more of the language tone information extracted from the script, the behavior state information derived from the audio signal, and the one or more human gestures derived from the video image.

After data processing as described above, each TED Talk is described by or comprises: 1) the original video and its associated or derived transcript; 2) extracted facial emotions per frame, e.g. first level of time granularity of the video signal, i.e. first level of time granularity of both the script and audio; 3) extracted audio and text emotions per transcript segment; 4) extracted human body gesture emotions; 5) aligned emotions of facial, audio, text, and gesture modalities per sentence, per word, and per frame. Emotions of each channel, i.e. each modality, are associated with any confidence values output by the corresponding models, and possibly further summarized by the preponderant emotion with highest confidence.

For task analysis, a user-centered design process was followed in close cooperation with two coaches, denoted as E1 and E2, from a presentation training company for about four months. Both coaches have more than five years of experience in presentation training. Their current coaching practice is grounded on videotaping presentations to analyze and provide feedback on the performance, which is tedious and time-consuming. Therefore, the system of the invention was iteratively developed and refined to assist them with the video analysis based on their feedback. Summarized here are the distilled visualization tasks according to the granularity level as follows:

Video level exploration aims to summarize the emotions of each video, and provide video context for detailed exploration denoted as follows:

T1 To summarize emotional information in a video. It is necessary to summarize emotional information to offer an overview of the entire video collection, which helps a user identify videos of interest and thereby guide effective exploration. The emotional information should include the emotional states of each modality and their coherence to represent the overall pattern.

T2 To provide video context for the analysis. Domain experts suggest that it is still essential to browse the original video for contextualized exploration in addition to summarized information. Due to the complexity of the data, visualizations should support rapid playback and guided navigation of the video in a screen-space-effective and responsive manner.

Sentence level exploration focuses on summarizing emotional coherence of sentences, as well as detailed information of each sentence denoted as follows:

T3 To summarize emotional coherence across different modalities per sentence. Sentences in each transcript segment form a basic semantic unit with the same text emotions in our model. Presenting their coherence with facial and audio emotions is possibly a vital prerequisite for understanding the emotional expressions in presentations. For instance, do speakers' facial impressions react in conformity with a joy message such as jokes?

T4 To support rapid location of sentences of interest. Our experts are interested in examining how is a certain emotion expressed, which demands rapid location of sentences with emotions of interest. In addition, they wish to search for sentences with similar emotional expressions in order to comprehend such behavior in the overall situation.

T5 To display emotional information along with additional feature for explanation. Experts suggest offering additional information such as the face images, prosodic features, and key words to verify and better understand the emotional expressions. This information should be displayed with the emotional information to guide the exploration.

Word/frame level exploration shows the emotion of each word/frame, and can reveal changes in how speakers convey their emotions denoted as follows:

T6 To enable inspecting the details of emotional expressions at the word level. At a more detailed level, the experts want to explore whether the emotional expressions are associated with words. For instance, whether a certain kind of words will likely accompany with changes in facial expressions?

T7 To show the temporal distribution of emotional states and their coherence. The temporal distribution of emotional states and coherence represents the most detailed and fundamental characteristics. This information should be presented in detail and responsively due to their large scale.

T8 To reveal transition points of emotional behavior. Our experts show interest in exploring the transition of emotional states, because they may help reveal interesting findings and patterns. Therefore, it is important to algorithmically extract those transition points and suppress irrelevant details to facilitate a more focused analysis.

Figure 2:
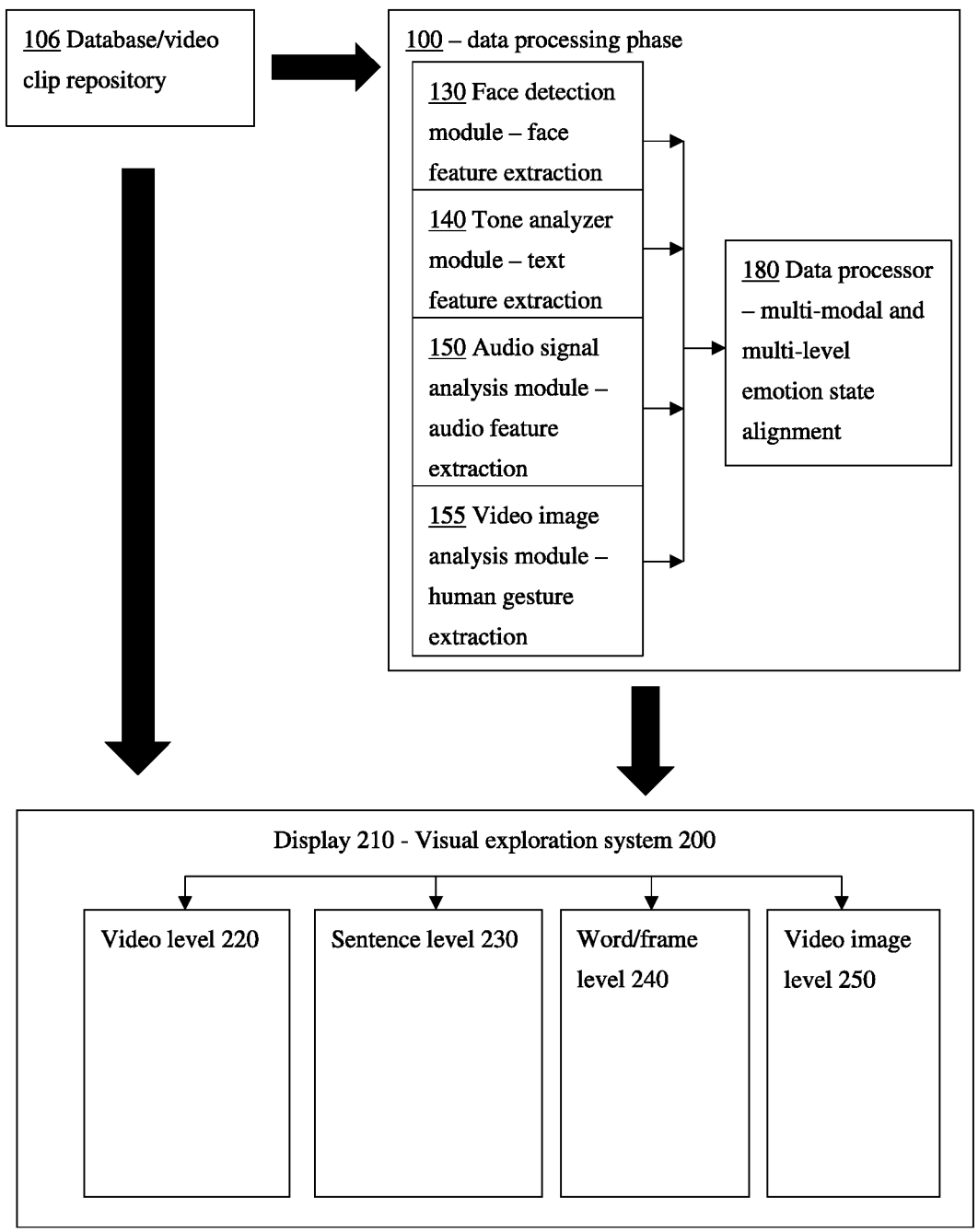
FIG. 2 is a block schematic diagram illustrating the analytical pipeline of the method in accordance with at least the first main aspect of the invention.

FIG. 2 illustrates the analytical pipeline of the method in accordance with the first main aspect of the invention. As illustrated in FIG. 2, the system starts with the data processing phase. After collecting the raw video data from a database or video clip repository 106 such as the TED Talks database, independent methods are used to extract emotion information from the face, text and audio modalities, also referred herein to as channels, of the video clip. The extracted data is stored in one or more memories 160 which are preferably configured to store such data in accordance with MongoDB™ to facilitate smooth data exploration.

In the visual exploration phrase, users can perform a three-level or four level exploration on the data visualization system 200 as represented by the "Display 210—Visual exploration system 200" box of FIG. 2 which is also representative of a screen forming part of the signal processing system 100 (FIG. 1). At the video level window 220, users can grasp a basic overview of each video and identify a video of interest for further exploration. Afterward, a summary of emotion coherence based on sentences is provided to help users further explore their sentences of interest. These users can also explore some keywords and transition points to further understand the latter. Also provided are sentence level 230 exploration window 230, word/frame level exploration window 240, and video image level exploration window 250. Three-level or four level exploration is dependent on which two or more of language tone information extracted from the script, the behavior state information derived from the audio signal, and the one or more human gestures derived from the video image are selected by a user of the visualization system 200.

Figure 3:
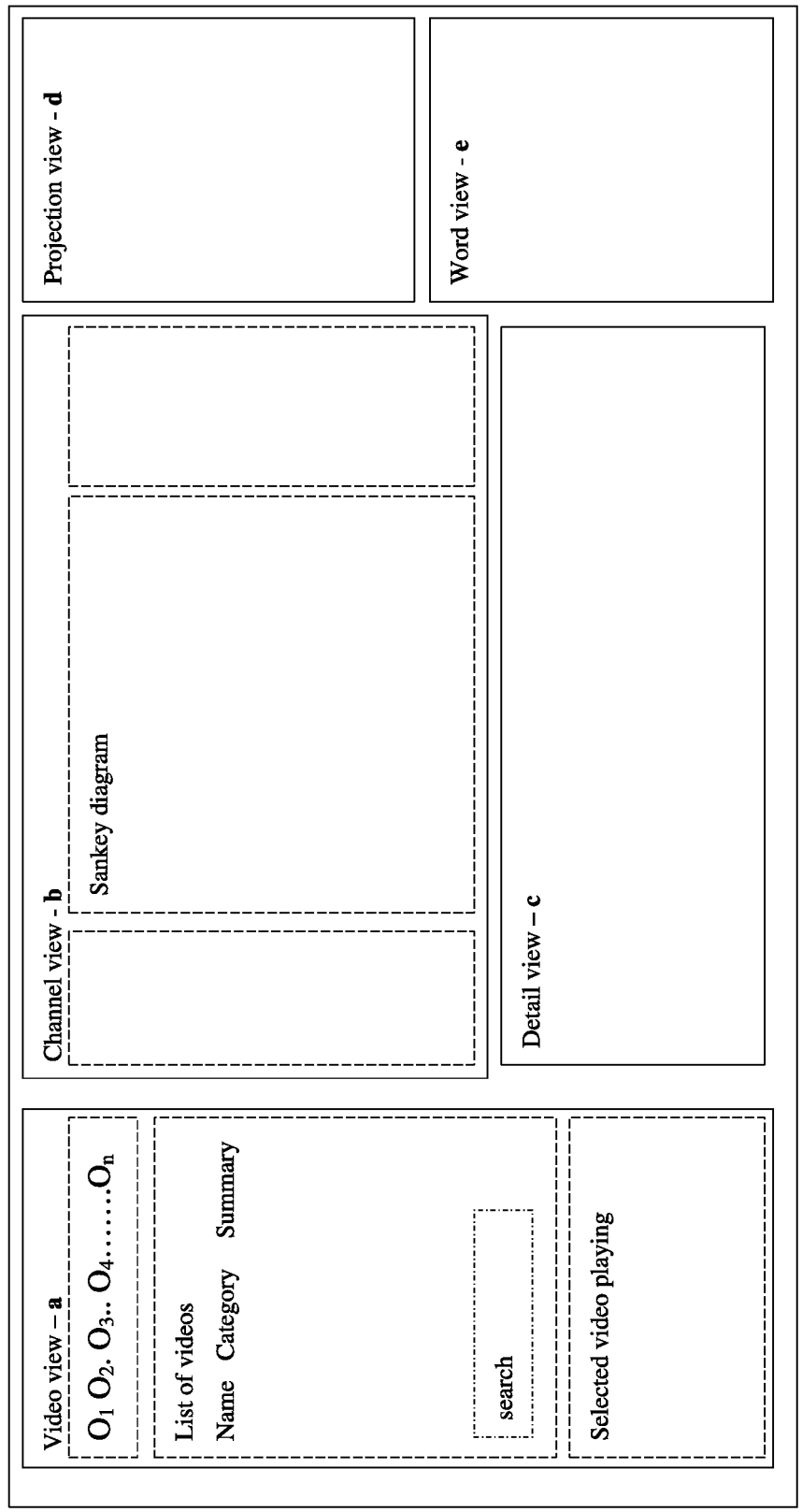
FIG. 3 illustrates a plurality of views comprising a display for the system in accordance with the present invention.

The visualization system 200 preferably has at least five views as shown in FIG. 3. The video view a presents a list of videos that provides a quick overview of the emotion status of three or four modalities/channels for each video (T1). Users can easily select a video of interest based on their observation for further exploration. The video view a presents the selected video at the bottom of said view to help users directly observe the original information from this video (T2).

A channel view b presents the emotion coherence information of the three or four channels by using an augmented Sankey diagram design (T3-T4). Some corresponding features extracted from different channels are then embedded into this view to give some hints on different channels for explanation (T5). The detail view c presents detailed information of a selected sentence and its contexts to help users analyze a specific sentence (T7-T8). The projection view d reveals the temporal distribution of emotion similarity across the three or four channels at the first level of granularity of the script, e.g. the sentence level, or the first level of granularity of the video signal. The word view e provides frequency of each word in the video transcript and allows users to compare different words with the face information and locate a specific word in the sentence and the video (T6).

Based on the aforementioned analytical tasks, a set of design rationales was determined with our collaborators to better design the visualization system as follows:

Multi-Level Visual Exploration. The mantra "Overview first, zoom and filter, then details on demand as discussed in reference B. Shneiderman. *The eyes have it: A task by data type taxonomy for information visualizations. In The Craft of Information Visualization*, pp. 364-371. *Elsevier*, 2003 has been widely used to provide the summary information of the video collection to provide users with some hints that can help them identify a video of interest. After selecting a video, users can further explore the emotion coherence at the sentence level. After selecting a sentence of interest, users can drill down the word/frame level.

Multi-Perspective Joint Analysis. To facilitate a detailed analysis of emotion coherence from the three channels in videos, various types of information should be provided. For a better interpretation, the features from these channels are extracted and embedded into the corresponding views. Multiple linked views that show different data perspectives are integrated into the system, and users can combine these views to achieve a multi-perspective joint analysis.

Interactive Pattern Unfolding. Given that the analysis of emotion coherence in presentation videos contains much hidden knowledge, users are required to conduct a trial-and-error process. It is helpful for users to interact with the data directly, so they can observe and interpret the results based on knowledge.

The top part of the video view a in FIG. 3 shows that to achieve a unified color encoding, we utilize the color scheme based on the Plutchik's emotional wheel as described in reference R. Plutchik. *The nature of emotions: Human emotions have deep evolu-tionary roots, a fact that may explain their complexity and provide tools for clinical practice. American Scientist*, 89(4):344-350, 2001, following the recommendations of our end users. The color scheme of emotions is denoted by $[O_1\ O_2.\ O_3\ \ldots\ O_4\ \ldots\ O_n]$ but can be seen more clearly in FIG. 4 although shown in greyscale.

Figure 4:
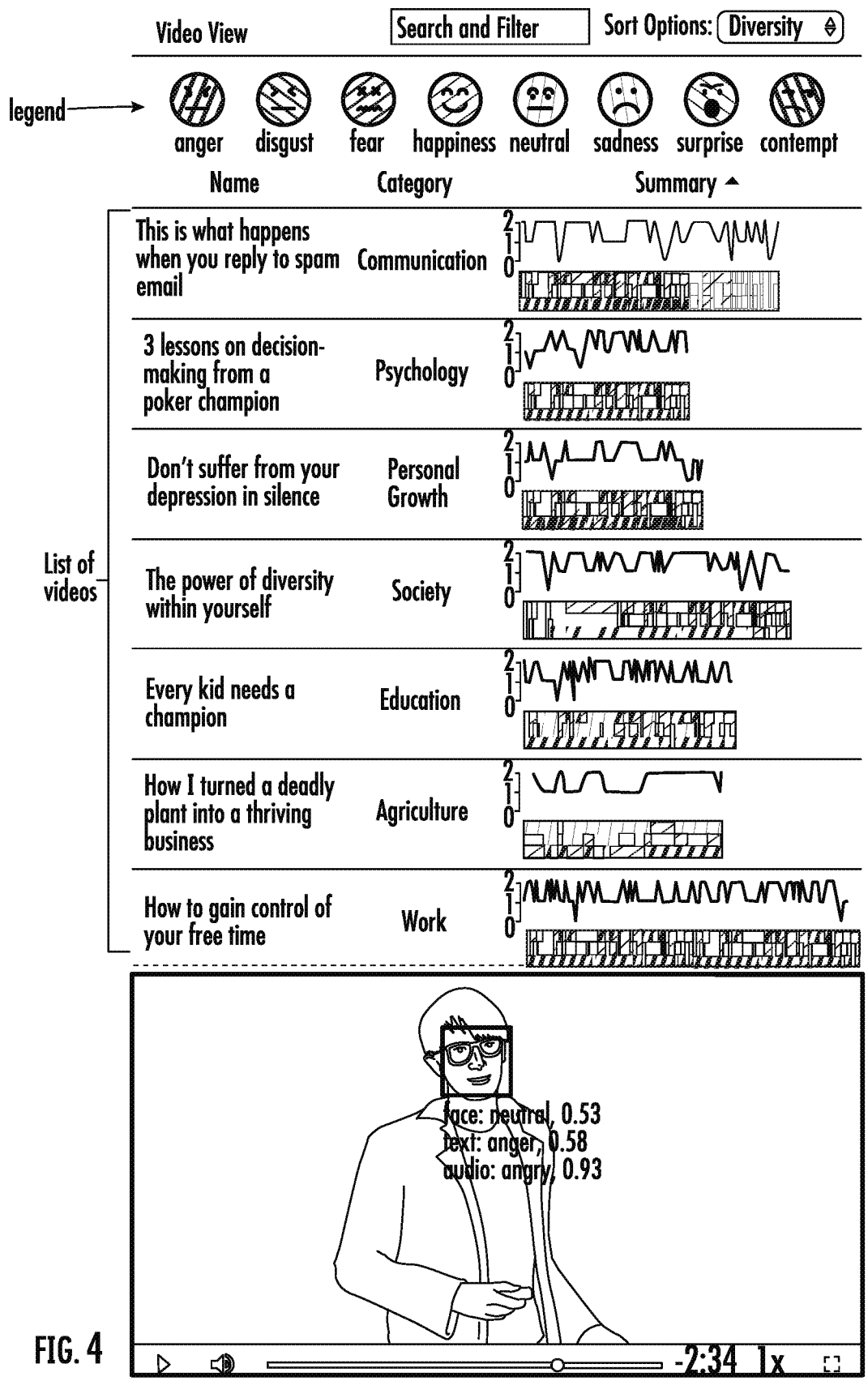
FIG. 4 provides an enlarged and more detailed view of a 'video view' part of FIG. 3.

It should be noted that FIG. 4 shows three modalities as it does not include the human gesture modality, but the principles of the invention as they apply to the human gesture modality when selected can be understood from the description of FIG. 4.

As shown in FIG. 3 and more clearly and expansively in FIG. 4, the video view a is divided into three parts. The top part of this view a comprises a legend, which presents the adopted color scheme that helps users observe the color for each emotion included in our system. The middle part presents a list of the video information. There are three columns in the video list, namely, "name", "category" and "summary". Each row provides these three types of information for each of the listed videos. The first two columns, which indicate the name of a video and its corresponding category, are easily understandable. The summary column, as more clearly seen in FIG. 5, uses a combination of a line chart and a bar code chart to show the incoherence of information of the three channels, which provides users with a quick overview that helps them in selecting a video of interest (T1). The line chart is used to explicitly show the emotional incoherence among the three channels. A higher value of the line corresponds to a higher incoherence, as shown in the following equation. Specifically, "0" means that emotions of the three channels are the same, while "2" means that emotions of these channels are different. Also included is a bar code chart to show the emotion information of the three channels, with the x axis representing the length of the video and the y axis representing the permutation of the face, text, and audio channels. The color of each rectangle (represented in greyscale in the drawings) represents the mix of emotions in the three channels.

It will be understood that, in some embodiments, only one of the line chart and the bar code chart may be provided or that other forms and combinations of forms for representing the data may be selected. However, it is preferred that at least the line chart is included as it has been found to enable a user to more efficiently and intuitively select a video having the user's desired, required or sought-after mix of emotional incoherence. Consequently, a user can quickly peruse the line charts for each video and make a selection of a video by the line chart pattern most appealing to that user's requirements on emotional incoherence. A user selection may be implemented by using a displayed cursor in a known manner.

Other manners of displaying the automatically generated coherence information may be employed, but a key point is that, whatever manner is selected, a user of the visualization system 200 can select a video from the displayed coherence information or pattern without needing to watch the video to make an initial assessment and/or without needing to know its subject matter or content. In fact, it is not even necessary to display the name and/or category or other identifying information for the listed videos in the video view a as it is the display of the incoherence, or conversely the coherence, data which enables a user to select a video for review and/or further analysis, etc.

Users can search or filter the video list by typing some key words in a search function. They can also sort the listed videos based on specific criteria, such as the coherence, diversity, and percentage of one type of emotion. After users click on a row, i.e. use a displayed cursor to click on one of the listed videos, the video of interest will be selected.

The measure of incoherence between the three modalities/channels of face, script and audio if preferably determined from:

$$D_{incoherence} = \begin{cases} 2, & E_{face} \neq E_{text}\ \&\ E_{text} \neq E_{audio}, \\ 0, & E_{face} = E_{text}\ \&\ E_{text} = E_{audio}, \\ 1, & \text{others} \end{cases}$$

where $D_{incoherence}$ indicates the degree of incoherence, and $E_{face}$, $E_{text}$, and $E_{audio}$ indicate one emotion type in the face, text, and audio channels. The line chart for each of the listed videos therefore comprises a line charting the changes between the values "0", "1" and "2" representing the levels of emotional incoherence between the emotional state data for the three channels at preferably one of levels of the granularity of the script, e.g. sentence level or word level.

It will be understood that the $D_{incoherence}$ equations can be adjusted where there are four channels for "face", "text", "audio" and "gestures".

It will be appreciated that if, for a listed video, the line of the line chart is relatively flat at the "0" level then the video has a high and fairly continuous level of coherence between the face, script and audio behavior states, e.g. the extracted emotions. In contrast, if the line of the line chart is relatively flat at the "2" level then the selected video has a high and fairly continuous level of incoherence between the face, script and audio behavior states, e.g. the extracted emotions. These may comprise measures or indicators of different types or genres of videos displayed in the video list or stored in the database 106 or another video repository and thus searchable by a user.

The degree and/or frequency of deviations from a flat line on the line chart between levels "0", "1" and "2" is a measure of the variance in behavior state incoherence between the three channels for the stored, selected or listed video. The degree and/or frequency of deviations can be measured and can provides results in a numerical form which can be used to rank stored or listed videos. The search function may therefore enable a user to enter one or more search criteria comprising a numerical level of incoherence and/or variance of incoherence and search for videos in the database 106 or listed videos in the video view a which match or closely match the entered search values. The entered search values may comprise ranges to increase an amount of videos returned in response to a user search.

After selecting a video of interest, the original video is presented in the bottom part of the video view a to allow users to explore detailed information (T2). End users wanted to refer to the original video when exploring the extracted information to facilitate their exploration. Although the extracted information from the video is informative, referring to the original video can sometimes provide a better explanation. In this view, users are allowed to play the video at a slow, normal, or fast speed. After pausing the video, the detected face is highlighted by a rectangle and the detected emotion information from the three channels will be shown at the same time overlaying the video preferably adjacent to the displayed rectangle. When exploring other views, users can easily find the corresponding video frames by some provided interactions as will be more fully described below.

It will be understood that the video view a may be reduced to a list of videos and a visual representation of the behavior state incoherence over time between the modalities of a selected one or each listed video at a predetermined level of granularity applied across all of the modalities.

Figure 5:
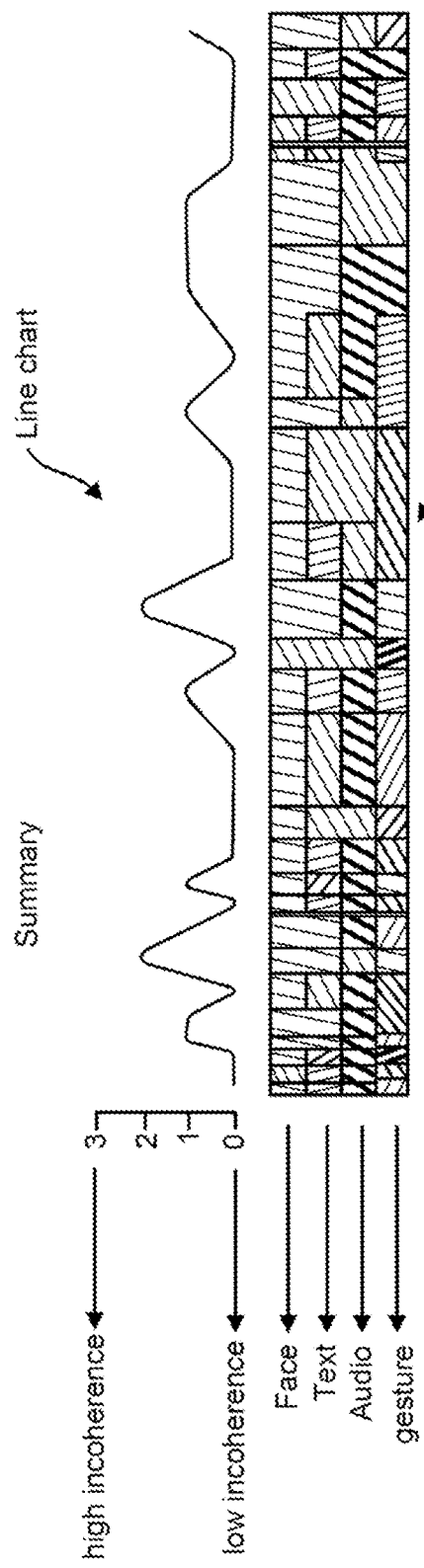
FIG. 5 shows an enlarged view of a line chart and bar code chart for a 'list of videos' part of the 'video view' part of FIG. 3.
Figure 6A:
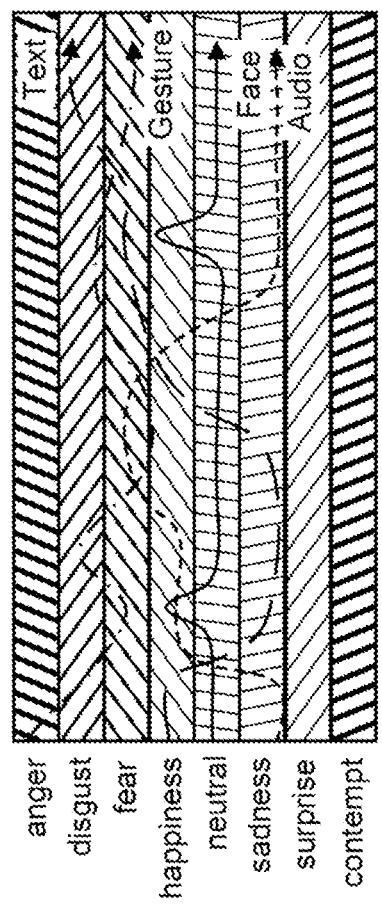
FIG. 6A shows different emotion categories.
Figure 6B:
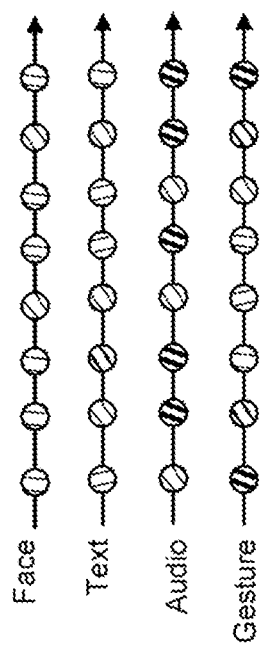
FIG. 6B shows a straight line indicating an emotion at a specific moment in time.

FIG. 5 and FIGS. 6A and 6B do include the human gesture modality.

As mentioned above, it is possible to display the incoherence between modalities for the listed or stored videos. For example, FIGS. 6A and 6B shows an alternative to FIG. 5 where, in FIG. 6A eight different-colored bands (shown in greyscale in the drawings) at the background represent different emotion categories. The emotion information from the four channels comprising "face", "audio", "text" and "gesture" are encoded by four different curves overlaying the background color bands. This then shows how emotion state has changed in each respective channel. Alternatively, in FIG. 6B a straight line is used to represent each channel with each color dot indicating an emotion at a specific moment in time. This design allowed users to easily observe how emotions change along the different channels. However, is was found that the compact a four-row bar code chart of FIG. 5 intuitively provides information more easily and quickly to a user perusing the bar code chart. It has been found that the bar code chart of FIG. 5 in concert with the line chart of the same drawing provides users with the ability to quickly and intuitively identify or select a video according to their preferments or requirements.

Figures 7A, 7B, 7C:
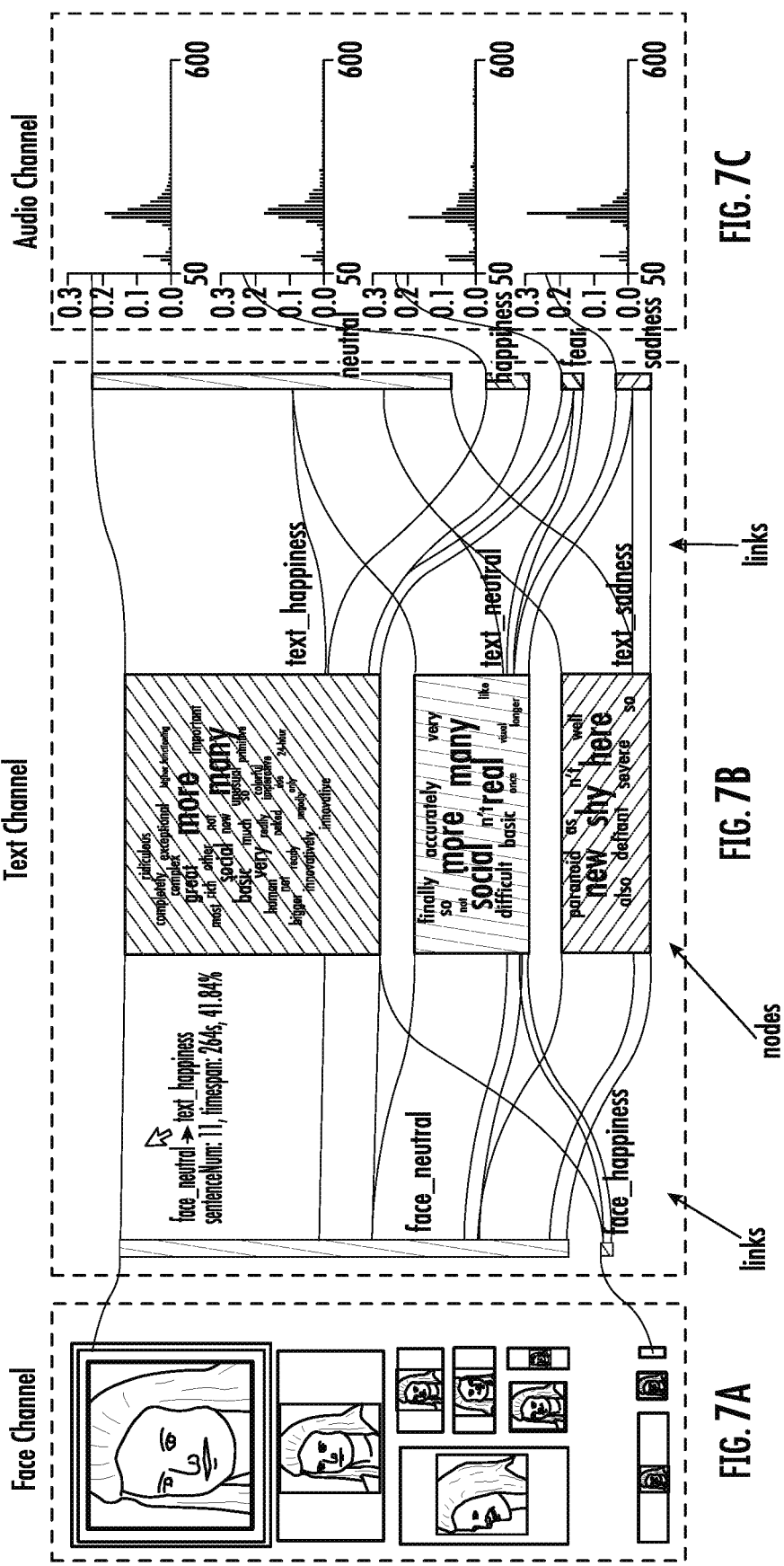
FIG. 7A represents face channel of the 'channel view.
' FIG. 7B represents a text channel of the 'channel view.
" and FIG. 7C represents an audio channel of the 'channel view'.

The channel view b of FIG. 3 is more clearly and expansively shown in FIGS. 7A, 7B, and 7C which again shows three channels, but the principles described are applicable to the four possible channels. To show the connection between the three channels in a selected video, as well as showing some features extracted from the corresponding channels, an augmented Sankey diagram is provided as shown in FIG. 7B. The channel view b contains three parts, namely a face channel (FIG. 7A) on the left-hand side of the channel view b, a text channel (FIG. 7B) in the center of the channel view b, and an audio channel (FIG. 7C) on the right-hand side of the channel view b. The augmented Sankey diagram of FIG. 7B visualizes the connections among the face, text, and audio channels (T3). The emotion information is detected based on each sentence in the videos. In this way, each node in the Sankey diagram represents one type of emotion and each link represents a collection of sentences with the emotions preferably between two channels, either face and text channels or text and audio channels, although other permutations could be employed. The height of each link represents the total duration of the corresponding sentences. Therefore, these links can give users some relevant information on how a speaker conveys his emotions from different channels when he utters these sentences. For example, a link from the left-hand neutral node to the middle happiness node shows that the speaker is talking about something happy while keeping a neutral face, while a link from the middle sadness node to the right-hand neutral node indicates that the speaker is saying something sadness in a neutral voice. We add a hover interaction feature to better illustrate the connection among these channels. In FIGS. 7A, 7B, and 7C when users hovers on a link between the left-hand and middle nodes, the corresponding link between the middle and right-hand nodes will also be highlighted, thereby highlighting the emotion connection among the three channels.

To provide more information from these channels, we embed features from these channels into the Sankey diagram (T5). For each node (face emotion) in the face channel, we adopt a treemap-based design to present an overview of the detected faces. Each rectangle in the treemap (FIG. 7A) represents a cluster (a link), whereas the size of the rectangle represents the number of faces in a specific cluster. As shown in FIG. 7A, the corresponding rectangle area of the link (neutral face, happiness text and neutral audio) is highlighted. Then, we overlay a representative image on each rectangle. Currently, the representative image for each cluster means the image nearest the center point of the cluster. Other strategies can be easily adopted. For text information, we embed a word cloud into the middle nodes. After counting their frequency and sentiment, we calculate the importance of each word. Therefore, a word cloud is used to show important words in the corresponding sentences and provide users with some contexts. For audio information (FIG. 7C), we use histograms to visualize the average distribution of corresponding sentences. Users can configure different audio features, including pitch, intensity, and amplitude, and then formulate the corresponding histograms.

Figure 8B:
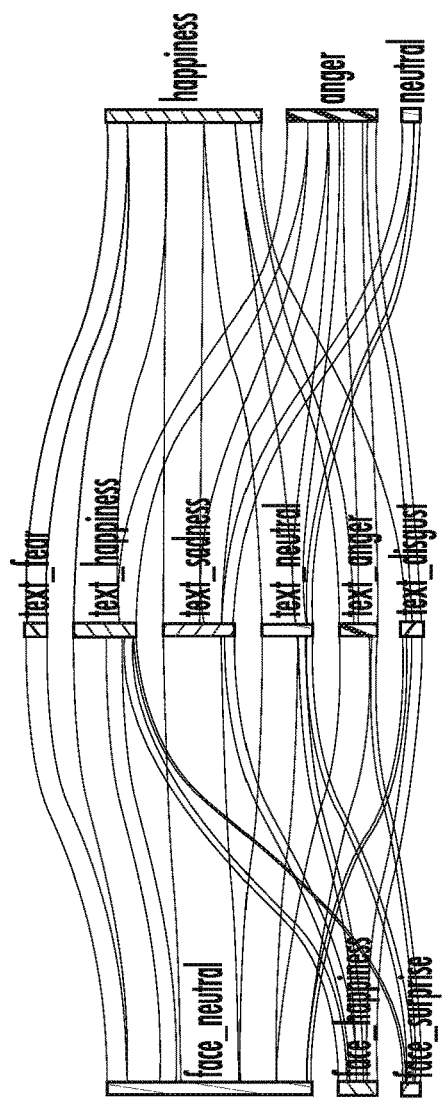
FIG. 8B shows an alternative Sankey diagram.
Figure 8A:
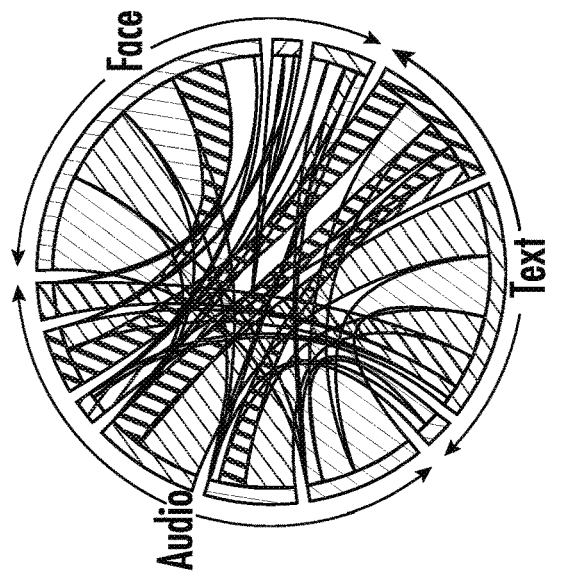
FIG. 8A shows an alternative in a chord-based diagram.

FIGS. 8A-8B shows an alternative to FIGS. 7A-C where, in a chord-based diagram (FIG. 8A), each channel is represented by an arc, and the links between different arcs represent their connection. Using this design, we could observe emotion coherence information of different channels. FIG. 8(*b*) shows an alternative Sankey diagram to that of FIG. 7R B but users expressed a preference for the diagram of FIG. 7B finding that it revealed more information more intuitively when viewed.

Figure 9:
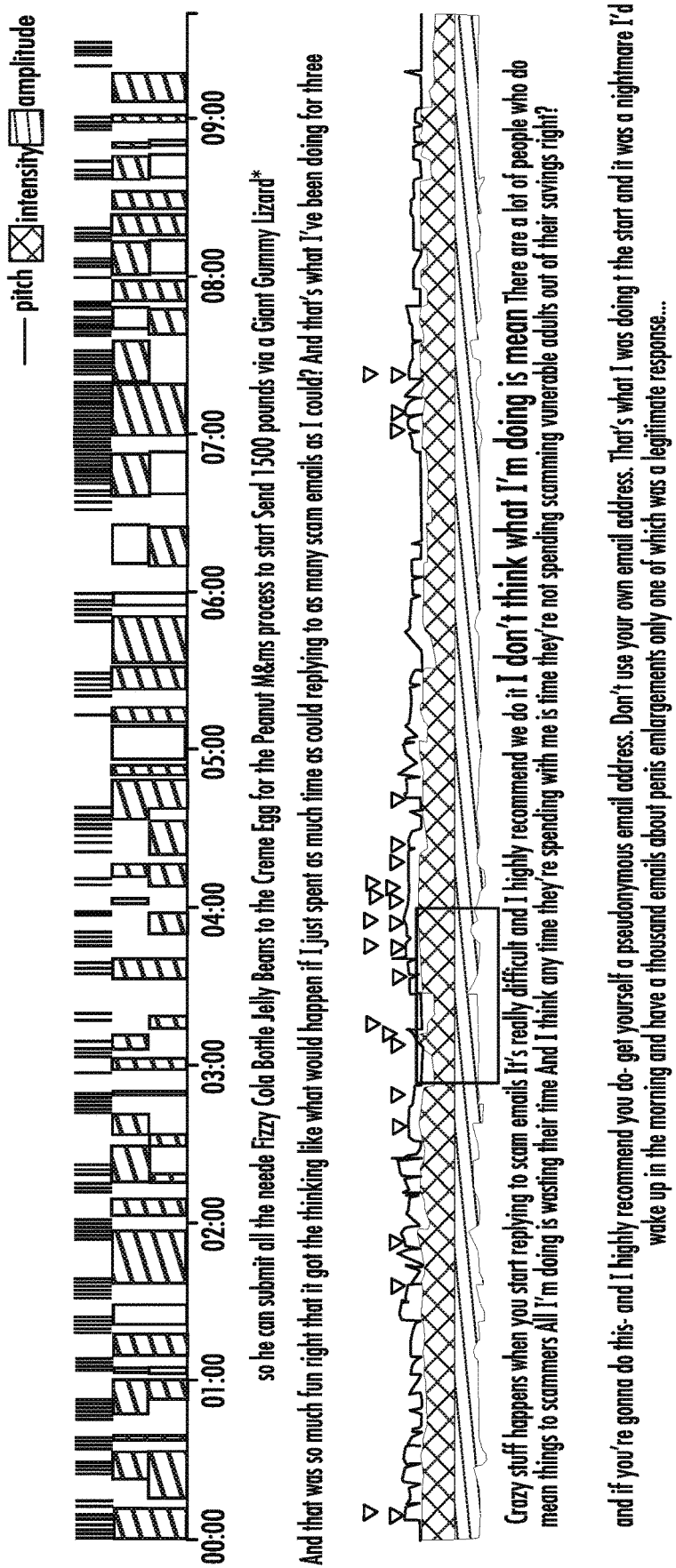
FIG. 9 provides an enlarged and more detailed view of a 'detail view' part of FIG. 3.

FIG. 9 is an enlarged view of the detail view c of FIG. 3. The detail view c contains two parts. A bar code chart at the top shows face emotions at frame level and text and audio emotions at sentence level, which provides a more detailed summary than the corresponding bar code in the video view a (FIGS. 3 and 4). Once users select a node or a link in the channel view c (FIGS. 3 and 7A-7C), those selected sentences will be highlighted in this bar code chart. Then users are enabled to select a sentence of interest for further exploration. The corresponding sentence context will be shown at the bottom part of the detail view c. Specially, the sentence being explored is shown in the middle with two previous sentences and two later sentences preferably also shown to provide more context. Three audio features for the selected sentence, i.e., pitch, intensity and amplitude, are preferably explicitly visualized as a line chart and theme river, which reveals temporal changes of audio features for this selected sentence. Users can brush on, i.e. select or highlight, part of the sentence, then corresponding words will be highlighted. What is more, to better visualize the changes of face emotions, we use two inverted right triangles to represent each transition point. The left one represents the emotion before change, the right one represents the emotion after change. To avoid visual clutter, dashed lines are used to indicate the location of the transition. Additionally, when transitions happen, corresponding words are also highlighted in colors (greyscale in the drawings) according to the changes of facial emotions.

The projection view d of FIG. 3 explores how a speaker changes his strategy in conveying emotion over time on different channels. An enlarged view of the projection view d is provided by FIG. 10B. The projection view d visualizes the temporal distribution of the emotion coherence information of different channels. As shown in FIG. 10B, inspired by the time-curved design of reference B. Bach, C. Shi, N.

Heulot, T. Madhyastha, T. Grabowski, and P. Dragice-vic. *Time curves: Folding time to visualize patterns of temporal evolution in data. IEEE Transactions on Visualization and Computer Graphics,* 22(1):559-568, 2016, we project emotion information of each sentence as a glyph point to a 2D plane by using the T-distributed Stochastic Neighbor Embedding (t-SNE) projection algorithm, where the vector is constructed as the following equation. Points are linked with curves by following time order. To show the information of each sentence more clearly, we design a pie chart-based glyph. Three equally divided sectors of a circle are used to encode emotion information of the face, text, and audio channels, respectively. To be specific, the top left shows audio emotion, the top right shows face emotion, and the bottom shows text emotion. Respective colors (greyscale in the drawings) are used to encode respective type of emotions and radius is used to encode emotion probability (certainty). The larger value of radius, the larger the emotion probability. To show temporal information of these sentences, both color and sentence ID in the middle of a glyph are used to encode time order. The lighter color means an earlier time, while the darker color means a later time.

$$\text{Vector}=[Pr(E_{face}),Pr(E_{text}),Pr(E_{audio})]$$

where Pr(•) indicates detection probability (uncertainty) for each emotion in the corresponding emotion category and E(.) indicates one type of emotion in different channels.

For four channels, the equation would be:

$$\text{Vector}=[Pr(E_{face}),Pr(E_{text}),Pr(E_{audio}),Pr(E_{gesture})]$$

The automatic generation of emotion probabilities and the manner such information is displayed once again enables a user to select a video for assessment or further analysis by the visualization system 200 without needing to watch the video to make an initial assessment and/or without needing to know its subject matter or content.

Figure 10A:
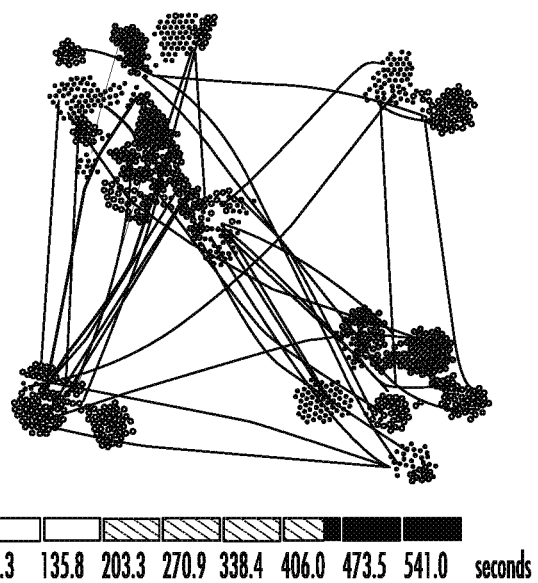
FIGS. 10A and 10B provide enlarged and more detailed view of alternatives for a 'projection view' parts of FIG. 3.
Figure 10B:
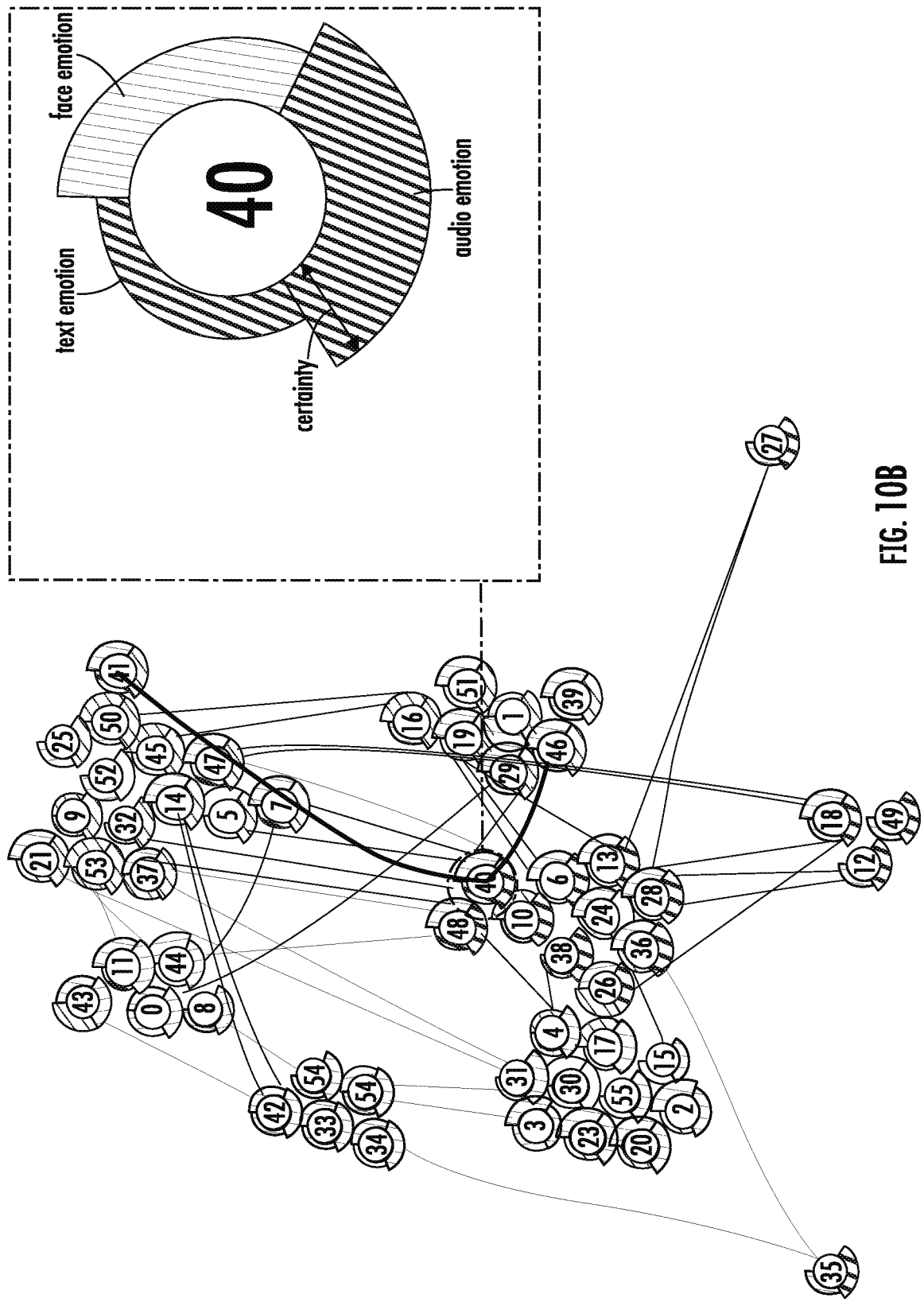

FIG. 10A shows an alternative to FIG. 10B which projects emotion information based on frame level, but users prefer the projection view of FIG. 10B.

End users expressed that they would like to further conduct word-level exploration, especially the frequency of the words used and corresponding emotions when uttering these words. In the word view e of FIG. 3 and as shown in enlarged form in FIG. 11, detailed information is provided for each word used in the video. Three attributes are shown, namely word, frequency, and face information. For each row, the word column directly shows the word used in the video; the frequency column indicates how many times this word is used in the video; and the face information column visualizes the duration of saying this word and the emotion percentage of face emotion by using a stacked bar chart. The length of each component in a stacked bar chart indicates duration of expressing one type of emotion. For those faces not detected, we use dashed areas to represent them. For focusing on detected emotions, users are allowed to hide these dashed areas by turning off the switch button. Further, users are allowed to sort the word view by specific criteria, such as frequency, as well as searching by key word.

The system of the invention illustrated by the drawings supports various user interactions and empowering users with strong visual analytic abilities. The five views provided in the system are linked together as follows:

Clicking Once users click a video of interest in the video view a, then the video will be selected and other views will be updated accordingly. In the channel view b, users can click nodes or links of interest, then corresponding sentences will be selected and highlighted in the detail view c. In the detail view c, users can click a sentence to explore its context information. Similarly, uses can click a word in the word view e to highlight sentences in detailed view. What is more, users are allowed to click the timeline in the detail view c to seek corresponding places in the video.

Brushing Users are enabled to brush the bar code in the detail view c to select corresponding sentences, then corresponding sentences will be highlighted in the projection view d. Conversely, users can brush some points in the projection view d, and the corresponding sentences will be highlighted in the bar code in the detail view c. What is more, once users select a sentence, they are allowed to brush an area of selected sentence and identify its words.

Searching and Sorting In the video view a and detail view c, to support users to quickly discover a row of interest, we add searching and sorting interactions. Users are allowed to search some key words and sort the list by a specific criterion or criteria.

In the following, some uses of the system of the invention are described by way of example only.

How to be emotional—in this scenario, we describe how Kevin, a professional presentation coach, can find examples for teaching his students to express emotions more effectively. His teaching is based on the book *Talk like TED* by the keynote speaker Carmine Gallo as per reference C. Gallo. *Talk like TED*, where the author attributes the best presentations to be emotional. To strengthen his teaching, Kevin would like to find more examples with considerable emotional expressions. However, it is time-consuming to browse the large video collections and identify representative clips. Therefore, he uses the system of the invention to explore the videos and find evidence for teaching.

After loading or accessing the video collection, Kevin directly notes the video list in the video view a. He wishes to find the video with the most emotions. Thus, he sorts the videos by diversity of emotions, whereby the video titled *This is what happens when you reply to spam email* appears at the top. He observes many colors in the corresponding bar code chart, which denotes that this presentation contains diverse emotions (T1). He also notes the frequent fluctuation of its line chart, which indicates that the speaker's emotional coherence varies a lot. As such, he considers this presentation to be representative for emotional expressions and clicks it for further exploration.

To understand overall emotional expressions (T3), he shifts attention to the Sankey diagram in the channel view (FIGS. 3 and 7A-7C). He immediately notices that the three Sankey bars have very different color distributions, and the Sankey links between the same color account for a small portion of widths. Those suggest that the emotional expressions are incoherent across each modality. He decides to explore each modality for detailed understanding. He starts with the leftmost Sankey bar-set and finds the predominate grey color, which indicates the most neutral facial expressions. Similarly, he observes a few happy and surprised facial expressions. Following the face thumbnails to its left, he finds that the speaker has rich facial movements (T5). For example, the speaker tends to raise the corner of his mouth with happy facial expressions, while his month tends to open with surprise. As such, Kevin deems facial recognition reliable. In contrast to the leftmost bar-set, Kevin observes more emotions including fear, neutral, happiness, anger, sadness, and disgust from other two bar-sets. He then inspects the histogram to its right, where he finds that anger and surprise tend to yield higher pitches. He considers these results to be reasonable based on his experience.

Next, Kevin decides to inspect detailed expressions with anger, an unusual emotion in presentations. By examining and comparing Sankey links passing red nodes (anger), he identifies the largest link which connects anger in text and audio modalities, and neutral facial expressions. Upon clicking that link, two corresponding sentences are highlighted in the bar code view (FIGS. 3 and 5). He selects the first sentence to unfold its details. Following the line chart in the middle, Kevin notices fluctuations of the black line and many glyphs, which denote rapid evolution of voice pitches and facial expressions (T8). By browsing the video clip, Kevin understands that the speaker expresses an angry message that replying to scam emails is not mean (T4). He emotes and performs theatrical facial and audio expressions, which render his presentation engaging. Next, he returns to the bar code view (FIG. 5) to analyze its context. He notes both the previous and next sentences have different emotions from the current sentence. Kevin is quite curious how the speaker conveys various emotions within such a short period.

He observes a gap between those two sentences, and further finds that the bar code tends to be discontinuous. Similarly, he notices large distances between two consecutive sentences in the projection view d (FIG. 10B), which indicates rapid changes of the emotions (T7). Interestingly, he finds that the facial modality behaves quite differently from the other two. Facial information usually does not accompany with text and audio information, and vice versa. To find out what happens in the video, Kevin quickly navigates those discontinuous parts in the bar code (T2). Finally, he finds that the absence of text and audio information is likely the speaker's presentation style. The speaker usually pauses for a while to await the audience reactions, which is a kind of audience interaction strategy.

Overall, Kevin considers this video to demonstrate the emoting presentation style, which is a good example for his teaching. The speaker adopts a rich set of emotions and tends to be incoherent in a theatrical manner, which renders his presentation infectious and engaging. Upon changing emotions, the speaker can pause for a while for the audience reaction and therefore interact with audiences.

How to tell jokes—in this scenario, Edward, another presentation coach, wants to teach a student to incorporate humor in his presentations. As the student mainly adopts neutral facial expressions, Edward would like to find examples where joke-telling accompanies with neutral facial expressions to promote personalized learning.

After loading or accessing the video collection, Edward sorts them by the percentage of neutral emotions in descending order. By comparing the bar codes in the Summary column (FIGS. 3 and 4), he finds that the video named "How I learned to communicate my inner life with Asperger's" contains the preponderant yellow grids in the middle row, which implies the predominant happy emotions in the text modality. Thus, he feels this video is interesting and clicks it to inspect details in other views.

Figure 12:
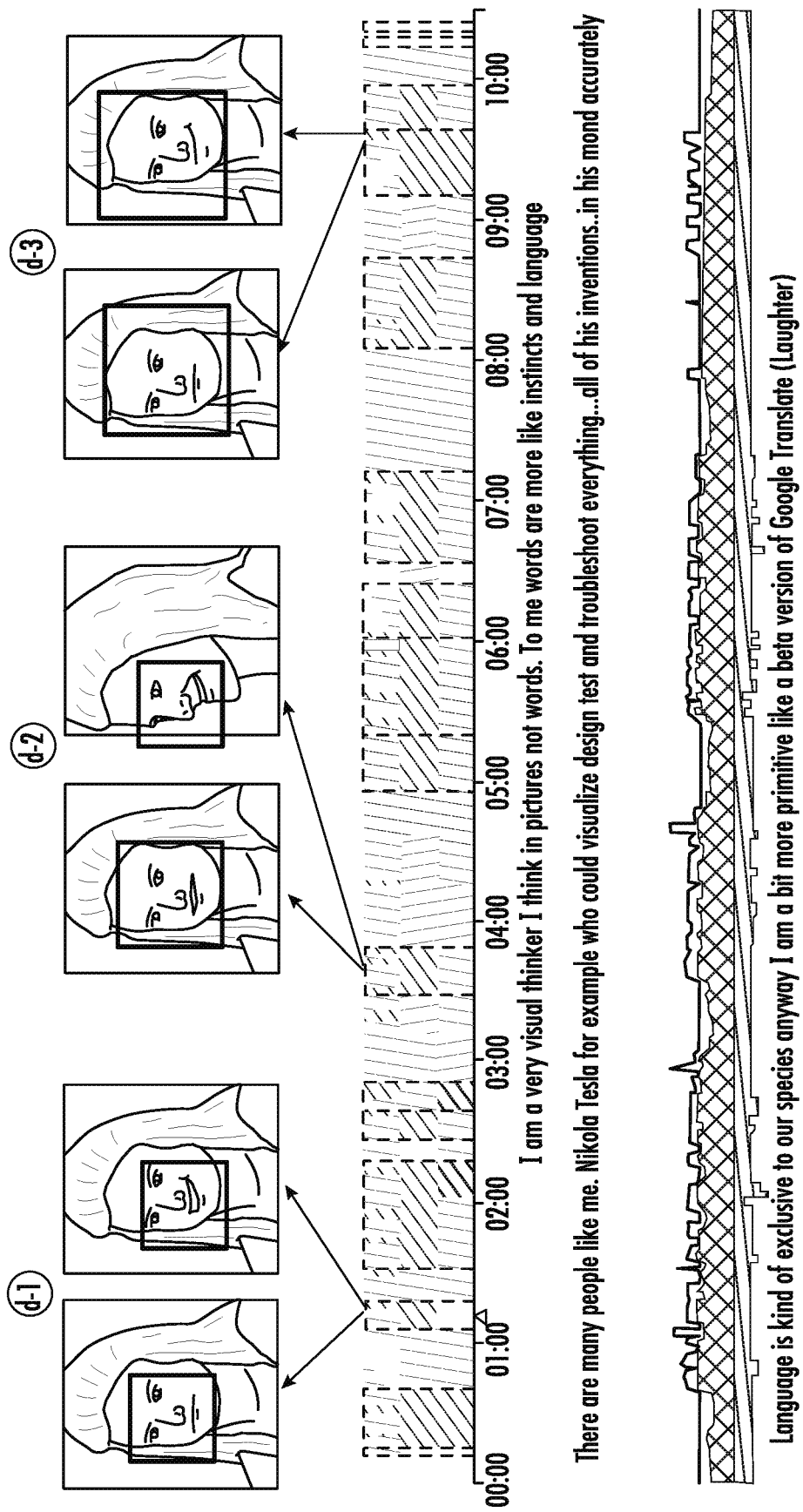
FIG. 12 provides an augmented and more detailed view of the bar code chart of the 'detail view'.

From the channel view c (FIG. 7A-7C), he first observes few emotions in each channel where the neutral expressions predominate. As highlighted in the darker Sankey link in FIG. 7A, the speaker tends to deliver happy messages with neutral facial and audio emotions. Since Edward wants to find examples of telling jokes, he clicks on the Sankey link between happy text and audio emotions. Corresponding sentences (Glyph 1 and 27) are highlighted in the projection view of FIG. 10B. To find other sentences with a similar way of emotion expressions, he simply brushes to the nearby area of the highlighted glyphs (T7) to locate them in the bar code view (FIG. 9 and FIG. 12). He then would like to explore how the speaker delivers those happy messages in detail.

For further exploration, he clicks some of these sentences, and then observes the context or looks back to the original video (T2). After examining these sentences, he finds that the speaker indeed tells some jokes with a presentation style, for example, for the sentence One in the bar code in FIG. 12 d-1. The pitch line tends to be flat (T5) and there are almost no face transition points (T8), which indicates that the speaker does not have many audio changes and face changes when saying this sentence. The speaker in this sentence tells the audience that she is a very visual thinker, and not good at language, just like a beta version of Google Translate. After hearing this, the audience laugh. The speaker smiles at the end. As for sentence Two in FIG. 12 d-2, the speaker tells the audience that she refused to shower due to hypersensitivity and now she assures her hygiene routine is up to standards. At that moment, the audience laugh and she similes again. As for sentence Three in FIG. 12 d-3, the speaker tells the audience that she loves lucid dreaming because she can do whatever she wants. Then the speaker throws an example "I'm making out with Brad Pitt and Angelina is totally cool with it." The audience find it very funny and laugh. The speaker also grins. Finally, Edward realizes that this is her presentation style in this video. The speaker tells something funny or ridiculous without showing too many emotions. What is more, Edward wants to check the words that the speaker uses in the video, which may give him more hints (T6). So, he directly sorts the words by frequency in the word view of FIG. 11. He finds that most of words the speaker uses are some general words, such as "you", "this", and "have". Interestingly, he finds that even when the speaker says the 'bad' word "autism", her face expressions are neutral, as shown in FIG. 12 d-3, which is corresponds to the previous findings. The speaker does not show too many emotions in face and audio channels most of the time. From her facial expressions, the audience maybe feel dry about the presentation. However, combing another two channels, she makes her presentation very interesting.

Overall, Edward thinks this is a good example for his student to learn from. He thinks the presentation style of this video is deadpan humor, a form of comedic delivery to contrast with the ridiculousness of the subject matter without expressing too many emotions.

To further evaluate our system, we conducted semi-structured interviews with our aforementioned collaborating domain experts (E1, E2). Both E1 and E2 were familiar with basic visualization techniques such as bar charts and curves. The interviews which were separated in two sessions were guided by a set of questions shown in Table 2 below.

TABLE 2

Questions for user interviews.

| | Aim | Question |
|---|---|---|
| Q1 | Visual Design | It is easy/hard to learn to read the video view? why? |
| Q2 | Visual Design | Is it easy/hard to learn to read the channel view? Why? |

TABLE 2-continued

Questions for user interviews.

| | Aim | Question |
|---|---|---|
| Q3 | Visual Design | It is easy/hard to learn to read the detail view? why? |
| Q4 | Visual Design | It is easy/hard to learn to read the projection view? why? |
| Q5 | Visual Design | It is easy/hard to learn to read the word view? why? |
| Q6 | Interaction Design | It is easy/hard to find a video of interest for further exploration? Why? |
| Q7 | Interaction Design | It is easy/hard to identify sentences/words of interest? Why? |
| Q8 | Interaction Design | It is easy/hard to find similar presentation style in a video? Why? |
| Q9 | General | Which part of the visual interface do you think can be further improved? How? |
| Q10 | General | Do you think the system is informative in exploring presentation videos? |

The experts were allowed to provide open-ended answers. Each interview session lasted about an hour. After introducing them to the functions, visual encodings, and basic views of our system, the experts were allowed to freely explore our system in a think-aloud protocol for twenty minutes. In general, we received positive feedback from the experts towards the system. Both experts appreciated the idea of leveraging visual analytics techniques to support an interactive exploration of presentation videos with novel encodings.

Both experts commented that they could easily find a video of interest by just navigating through the concise summary of each video presented in the video view. E1 shared that "the quick summary provides me with visual hints about the video style, which greatly facilitates me in finding the video I am interested in." Meanwhile, E2 also mentioned that the interactions in the video view including searching and sorting were very useful when exploring the presentation videos. Both experts appreciated the ability of our system to identify sentences and words of interest. E2 commented that the current system provides detailed information which facilitates him in detecting abnormal emotion coherence and emotion changes, "Usually, I tend to pay attention to those unexpected sentences such as saying something sad with happy emotion, and I would double check whether it is the real case or caused by some problematic emotion detection. These views are very helpful for me to do this checking." E1 was more interested in those emotion transition points, "these transition points usually indicate different contents in a talk. The word view shows the key words in the context, allowing the speaker to understand how to improve his presentation skills by using the appropriate words."

Both domain experts expressed their interests in applying the system to deal with practical problems in their daily work. Previously, to improve presentation skills, they would ask the speakers to conduct multiple practice talks and record them for later analysis. This process was time-consuming and cannot provide any quantitative analysis. E1 stated that the system is the first computer-aided visualization system for emotional analysis and presentation training that I have ever seen, and it can definitely help me analyze those presentation practice videos and train speakers with clear visual evidence." E2 especially appreciated the human-in-the-loop analysis by sharing that "the cooperative process with the system is of great benefit in emotional analysis as the system provides quantitative measures on the level of emotion coherence and we can determine whether it makes sense or not."

It will be appreciated that the system as described may be modified to improve various aspects including quantitative measures of emotion coherence, using a broader range of emotion categories, devising new ways of labelling emotions across different modalities, and segmenting and sampling longer duration videos to avoid clutter.

The present invention therefore provides an interactive visual analytics system to analyze emotional coherence across different behavioral modalities in presentation videos. In the specific embodiments as described above, the system comprises five linked views, which allow users to conduct in-depth exploration of emotions in three levels of details (i.e., video, sentence, word level). It integrates well-established visualization techniques and novel designs to support visual analysis of videos. In particular, it utilizes an augmented Sankey diagram design for analyzing emotional coherence and a clustering-based projection design for tracking the temporal evolution, facilitating the exploration of multimodal emotions and their relationships within a video.

The system could be modified to include additional modalities such as hand gestures. Moreover, advanced data mining techniques could be incorporated to enhance the data analysis.

The method of visualization of the invention integrates and tailors the described visualization approaches to varying levels granularity.

In summary, the present invention provides a system to help users explore and compare the emotion consistency of multiple channels, including the emotions from facial expression, audio and text, with multiple levels of detail. The invention also provides novel designs to facilitate easy exploration of emotion coherence, such as the channel view with an augmented Sankey diagram design to support quick exploration of detailed emotion information distribution in each channel, and the projection view based on clustering to track the temporal evolution.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any of the embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

We claim:

1. A computer implemented method of processing a video signal, comprising the steps of:
   detecting a human face displayed in the video signal and extracting physiological, biological, or behavior state information from the displayed face at a first level of granularity of the video signal;
   processing any two or more of:
   a script derived from or associated with the video signal to extract language tone information from said script at a first level of granularity of the script;
   an audio signal derived from or associated with the video signal to derive behavior state information from said audio signal at a first level of granularity of the audio signal;
   a video image derived from the video signal to detect one or more human gestures of the person whose face is displayed in the video signal at a first level of granularity of the video image;
   wherein the first level of granularity of the video signal comprises a frame level of the video signal, the first level of granularity of the script comprises a script segment level such as a sentence level of the script, the first level of granularity of the audio signal comprises a script segment level of the script; and the first level of granularity of the video image comprises the first level of granularity of the video signal;
   merging said physiological, biological, or behavior state information extracted from the displayed face in the video signal with two or more of the language tone information extracted from the script, the behavior state information derived from the audio signal, and the one or more human gestures derived from the video image, wherein said merging step is based on behavior state categories and/or levels of granularity.

2. The method of claim 1, wherein detecting one or more human gestures from the video image includes extracting physiological, biological, or behaviour state information from the detected one or more human gestures.

3. The method of claim 2, wherein the step of detecting one or more human gestures comprises detecting one or more body gestures of the person whose face is displayed in the video signal.

4. The method of claim 1, wherein the video image derived from the video signal to detect one or more human gestures comprises a single frame still image derived from the video signal; multiple frames from the video signal; a portion of the video signal; and the whole of the video signal.

5. The method of claim 1, wherein the first level of granularity of the audio signal comprises the first level of granularity of the script and wherein the audio signal is initially processed to segment said audio signal in accordance with a prior segmentation of the script based on the first level of granularity of the script.

6. The method of claim 1, wherein the step of processing the audio signal to derive behavior state information comprises extracting power spectrum information at said first level of granularity of the audio signal and using said power spectrum information to derive said behavior state information.

7. The method of claim 1, wherein the physiological, biological, or behavior state information extracted from the displayed face in the video signal comprises emotion information derived from the displayed face at said first level of granularity of the video signal, and any two or more of: said language tone information extracted from said script comprises emotion information derived from said script at said first level of granularity of the script, said behavior state information derived from said audio signal comprises emotion information derived from said audio signal at said first level of granularity of the audio signal; and said one or more human gestures derived from the video image comprises emotion information at said first level of granularity of the video signal.

8. The method of claim 7, wherein the merging step comprises grouping the emotion information derived from the displayed face with any two or more of: the emotion information derived from said script, the emotion information derived from the audio signal into emotional categories across a plurality of different levels of granularity, and the emotion information derived from said one or more human gestures.

9. The method of claim 8, wherein, when grouping the emotion information derived from the displayed face, the emotion information derived from said script, and the emotion information derived from the audio signal into emotional categories across the first level of granularity of the script, the method includes determining from the video signal a most frequent facial emotion at said first level of granularity of the script and selecting the most frequent facial emotion as a representative emotion of a respective segment of the video signal at said first level of granularity of the script, and grouping representative emotions of respective segments of the video signal with the emotion information derived from said script at said first level of granularity of the script and the emotion information derived from the audio signal at said first level of granularity of the script.

10. The method of claim 9, wherein the video image selected from the video signal for detecting one or more human gestures is selected to be coincident with one of the occurrences of the detected most frequent facial emotion at said first level of granularity of the script and selecting the most frequent facial emotion.

11. The method of claim 8, wherein the plurality of different levels of granularity comprise: (i) a frame level of the video signal; (ii) a sentence level of the script; and (iii) a word level of the script.

12. The method of claim 11, wherein the plurality of different levels of granularity are mapped with each other based on a timeline associated with the script.

13. The method of claim 8, wherein any of the emotion information derived from the displayed face at said first level of granularity of the video signal, the emotion information derived from said script at said first level of granularity of the script, the emotion information derived from the audio signal at said first level of granularity of the audio signal, or the emotion information derived from the one or more human gestures at said first level of granularity of the video signal comprises a plurality of predefined emotions.

14. The method of claim 1, wherein the physiological, biological, or behavior state information extracted from the video signal, said language tone information extracted from said script, said behavior state information derived from the audio signal, and said behavior state information derived from the video image are each derived independently from one another.

15. The method of claim 1, wherein the step of extracting physiological, biological, or behavior state information from the displayed face at a first level of granularity of the video signal is based on a preponderant face detected in the video signal at said first level of granularity of the video signal.

16. The method of claim 1, wherein, prior to processing the audio signal to derive behavior state information, said audio signal is processed to filter out parts of the audio signal containing a behavior state indicative of human laughter.

17. A system for processing a video signal, comprising:
a face detection module to detect a human face displayed in the video signal and extract physiological, biological, or behavior state information from the displayed face at a first level of granularity of the video signal; and two or more of:

(i) a tone analyzer module to process a script derived from or associated with the video signal to extract language tone information from said script at a first level of granularity of the script;

(ii) an audio signal analysis module to process an audio signal derived from or associated with the video signal to derive behavior state information from said audio signal at a first level of granularity of the audio signal; and (iii) a video image analysis module to process a video image derived from the video signal to detect one or more human gestures of the person whose face is displayed in the video signal at a first level of granularity of the video image;

wherein the first level of granularity of the video signal comprises a frame of the video signal, the first level of granularity of the script comprises a script segment such as a sentence of the script, the first level of granularity of the audio signal comprises a script segment of the script; and the first level of granularity of the video image comprises the first level of granularity of the video signal; and a data processor to merge said physiological, biological, or behavior state information extracted from the video signal with two or more of the language tone information extracted from the script, the behavior state information derived from the audio signal, and the one or more human gestures derived from the video image;

wherein the data processor is configured to merge said information based on behavior state categories and/or levels of granularity.

18. The system of claim 17, wherein the tone analyzer module is configured to utilize one or more of the Mel Frequency Cepstral Coefficient (MFCC), the disclosure of Audio-Textual Emotion Recognition Based on Improved Neural Networks, the disclosure of Convolutional MKL Based Multimodal Emotion Recognition and Sentiment Analysis, the disclosure of A new approach of audio emotion recognition, or the disclosure of Multimodal Language Analysis in the Wild: CMU-MOSEI Dataset and Interpretable Dynamic Fusion Graph to process said audio signal to extract power spectrum information at said first level of granularity of the audio signal and to feed said extracted power spectrum information into a pre-trained baseline model for speech emotion recognition to derive said behavior state information from said audio signal at said first level of granularity of the audio signal.

19. The system of claim 18, wherein the pre-trained baseline model for speech emotion recognition uses one or more of the RAVDESS dataset, IEMOCAP dataset, the AIBO dataset, or the CMU-Multimodal SDK dataset or one or more of the datasets of Table 1 to derive said behavior state information from said audio signal at said first level of granularity of the audio signal.

* * * * *